United States Patent
Banister et al.

(10) Patent No.: US 7,630,427 B2
(45) Date of Patent: Dec. 8, 2009

(54) SYSTEMS, METHODS, AND APPARATUS FOR ESTABLISHING FINGER LOCK STATE

(75) Inventors: Brian Clarke Banister, San Diego, CA (US); Jing Liu, Jersey City, NJ (US); Kuang-Hsuan Tu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 599 days.

(21) Appl. No.: 11/361,887

(22) Filed: Feb. 24, 2006

(65) Prior Publication Data

US 2007/0071072 A1    Mar. 29, 2007

Related U.S. Application Data

(60) Provisional application No. 60/722,131, filed on Sep. 29, 2005.

(51) Int. Cl.
   *H04B 1/707*   (2006.01)
(52) U.S. Cl. ...................................... 375/148
(58) Field of Classification Search ................ 375/142, 375/144, 148, 150; 370/320, 335, 342, 441
See application file for complete search history.

(56) References Cited

U.S. PATENT DOCUMENTS

| | | | |
|---|---|---|---|
| 5,490,165 A | | 2/1996 | Blakeney, II et al. |
| 5,703,902 A | * | 12/1997 | Ziv et al. ................... 375/228 |
| 5,754,583 A | | 5/1998 | Eberhardt |
| 5,764,687 A | | 6/1998 | Easton |
| 5,930,288 A | * | 7/1999 | Eberhardt ................... 375/148 |
| 6,201,827 B1 | | 3/2001 | Levin |
| 6,345,078 B1 | | 2/2002 | Basso |
| 6,408,039 B1 | | 6/2002 | Ito |
| 6,625,197 B1 | | 9/2003 | Lundby |
| 6,711,420 B1 | | 3/2004 | Amerga |
| 6,735,240 B1 | | 5/2004 | Kang |
| 6,785,554 B1 | | 8/2004 | Amerga |
| 2002/0101909 A1 | | 8/2002 | Chen et al. |
| 2002/0105375 A1 | | 8/2002 | Sorokine |
| 2002/0126744 A1 | * | 9/2002 | Bender et al. ............. 375/148 |
| 2003/0013457 A1 | | 1/2003 | Amerga |
| 2003/0067898 A1 | | 4/2003 | Challa |
| 2003/0091103 A1 | | 5/2003 | Sendonaris |
| 2004/0125862 A1 | | 7/2004 | Li |
| 2004/0139466 A1 | | 7/2004 | Sharma |
| 2004/0176038 A1 | | 9/2004 | Luo |
| 2004/0184513 A1 | | 9/2004 | Lundby |
| 2004/0184515 A1 | | 9/2004 | Im |
| 2005/0078623 A1 | | 4/2005 | Hirade |
| 2005/0085230 A1 | | 4/2005 | Welnick |

FOREIGN PATENT DOCUMENTS

| | | |
|---|---|---|
| WO | 0145295 A2 | 6/2001 |
| WO | 0229996 A2 | 4/2002 |
| WO | 03007499 A1 | 1/2003 |

* cited by examiner

*Primary Examiner*—Don N Vo
(74) *Attorney, Agent, or Firm*—Alex C. Chen; Jeffrey D. Jacobs

(57) ABSTRACT

Embodiments include a method of signal processing in which each of a set of individual estimates of a transmitted symbol is added to a combined symbol estimate based on a relation between a signal quality value corresponding to the individual estimate and a threshold value, where the threshold value is based on a maximum among the signal quality values.

23 Claims, 25 Drawing Sheets

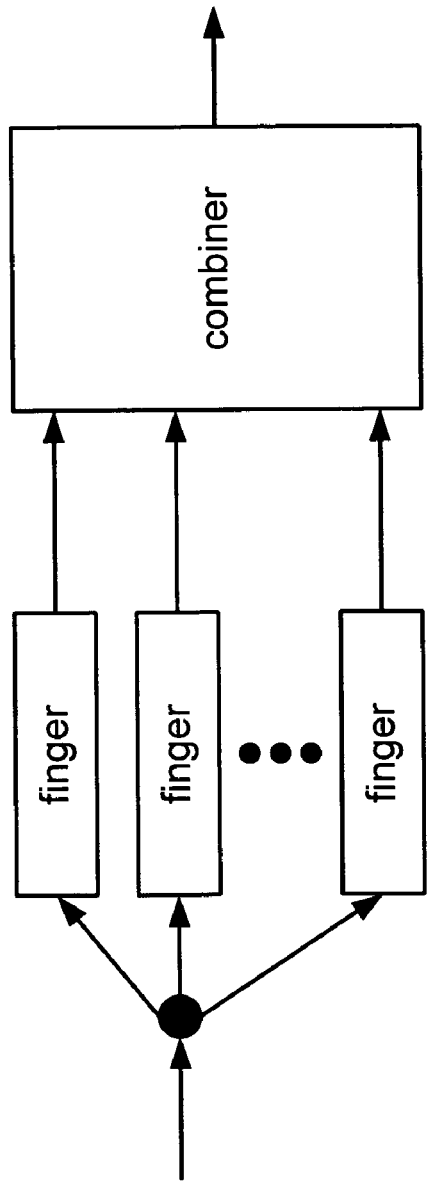
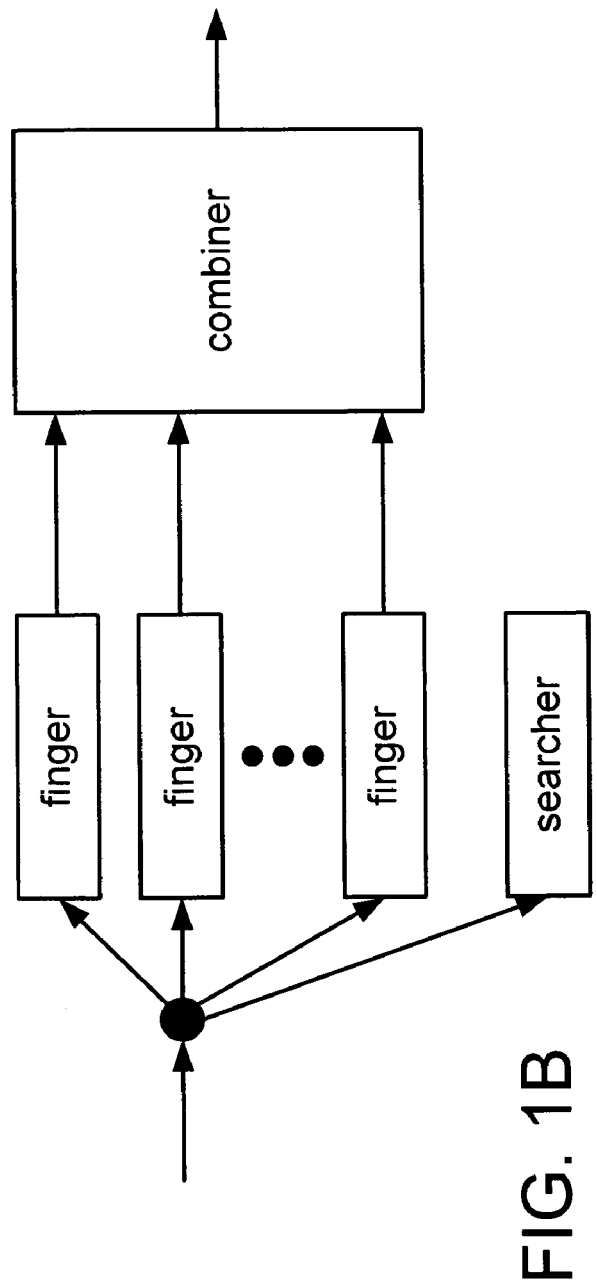
FIG. 1A
FIG. 1B

SYSTEMS, METHODS, AND APPARATUS FOR ESTABLISHING FINGER LOCK STATE

RELATED APPLICATIONS

This application claims benefit of U.S. Provisional Patent Application No. 60/722,131, entitled "SYSTEMS, METHODS, AND APPARATUS FOR ESTABLISHING FINGER LOCK STATE," filed Sep. 29, 2005.

FIELD OF THE INVENTION

This invention relates to wireless communications.

BACKGROUND

Spread spectrum techniques are widely used for wireless communication. Current applications of spread spectrum technology include systems for cellular telephony, systems for cellular data transfer, systems for communications between satellites and ground stations, and wireless local-area networks. One common implementation of spread spectrum technology is code division multiple access (CDMA) signal modulation. A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the WCDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005—A Upper Layer (Layer 3) Signaling Standard for cdma2000 Spread Spectrum Systems," and the "C.S0024 CDMA2000 High Rate Packet Data Air Interface Specification" (the CDMA2000 standard), and (5) other standards.

In a typical CDMA system, data traffic such as voice and/or other information is exchanged over a wireless link between a base station (also called a base transceiver station or BTS) and a user equipment (UE). The BTS may also be configured to exchange the information with one or more networks such as a public switched telephone network (PSTN) and/or a packet data switched network (PDSN). A BTS may communicate with other BTSs and/or controllers to support activities such as handoff of a communications session with a mobile UE. Communications between the BTS and a network or other BTS may be performed over wired and/or wireless connections.

A UE may include a receiver embodied in a cellular telephone, such as a mobile telephone or a fixed installation as may be found in a wireless local loop (WLL). Typically the receiver is included in or integrated into a transceiver of the UE. The receiver may include, or may be embodied in, a chip or chipset of the UE. The UE may be part of another mobile or portable unit, such as a wireless data modem or other peripheral device, a personal digital assistant (PDA), or a global positioning system (GPS) device. The UE may also include or be a part of a camera or another multimedia device such as a video or MP3 player.

Several instances of a single transmitted spread-spectrum signal may reach the receiver, each instance corresponding to a different propagation path and arriving at a different time. Receivers or transceivers for spread-spectrum signals typically use a rake receiver architecture to process more than one received instance of a transmitted signal. FIG. 1A shows an example of a rake receiver having multiple fingers (also called "demodulation elements" or "finger processors"), in which each finger outputs an estimate of the received symbol that corresponds to a different multipath instance of the signal. After deskewing to compensate for the relative time delays (or "skew") between the instances, a combiner adds the various symbol estimates together to generate a combined symbol estimate.

The particular multipath instance that each finger tracks may be determined autonomously by the finger, cooperatively among the fingers, and/or according to an assignment received by the finger from a searcher. FIG. 1B shows an example of a rake receiver architecture that includes a searcher. The searcher determines the locations in time of peaks in the received multipath signal and assigns each finger to a path according to the time offset of the corresponding peak. The searcher may provide an offset value to the finger, indicating the delay of the assigned path in terms of code phase, or the searcher may supply a version of the spreading code that is offset according to the delay of the assigned path.

As symbol estimates corresponding to more received instances of the same symbol are combined, it may be expected that the signal-to-noise ratio (SNR) of the combined estimate will be improved. Thus it is generally desirable to combine symbol estimates corresponding to several different received instances if possible. Some received instances may be weak, however, such that they contain more noise energy than signal energy. Including an estimate from such an instance may reduce the overall SNR, and in these cases it may be desirable to exclude the estimate from the combined symbol estimate.

SUMMARY

A method of signal processing according to an embodiment includes obtaining, for each of a plurality of received instances of a transmitted signal, a complex-valued estimate of a symbol carried by the transmitted signal and a signal quality value. The method also includes calculating, based on at least one among the plurality of signal quality values, a threshold value and, for each of the plurality of received instances, determining a corresponding lock state. For at least one of the plurality of received instances, determining a lock state is based on a relation between the corresponding signal quality value and the threshold value. The method includes calculating, based on the symbol estimates and the corresponding lock states, a complex-valued combined estimate of the symbol carried by the transmitted signal.

An apparatus for signal processing according to an embodiment includes a plurality of fingers, each configured to calculate, for a corresponding one of a plurality of received instances of a transmitted signal, (A) a signal quality value and (B) a complex-valued estimate of a symbol carried by the transmitted signal. The apparatus also includes a threshold calculator configured to calculate a threshold value based on at least one among the plurality of signal quality values; a comparator configured to determine a lock state for each of the plurality of received instances; and a combiner configured to calculate, based on the symbol estimates and the corresponding lock states, a complex-valued combined estimate of the symbol carried by the transmitted signal. For each of more than one of the plurality of received instances, the comparator is configured to determine the corresponding lock state based on a relation between the corresponding signal quality value and the threshold value.

BRIEF DESCRIPTION OF THE DRAWINGS

For convenience of illustration, time-varying values relating to received instances in the attached figures are shown as deskewed in time relative to one another.

FIG. 1A shows a block diagram of a rake receiver.

FIG. 1B shows a block diagram of a rake receiver that includes a searcher.

DETAILED DESCRIPTION

Figure 2:
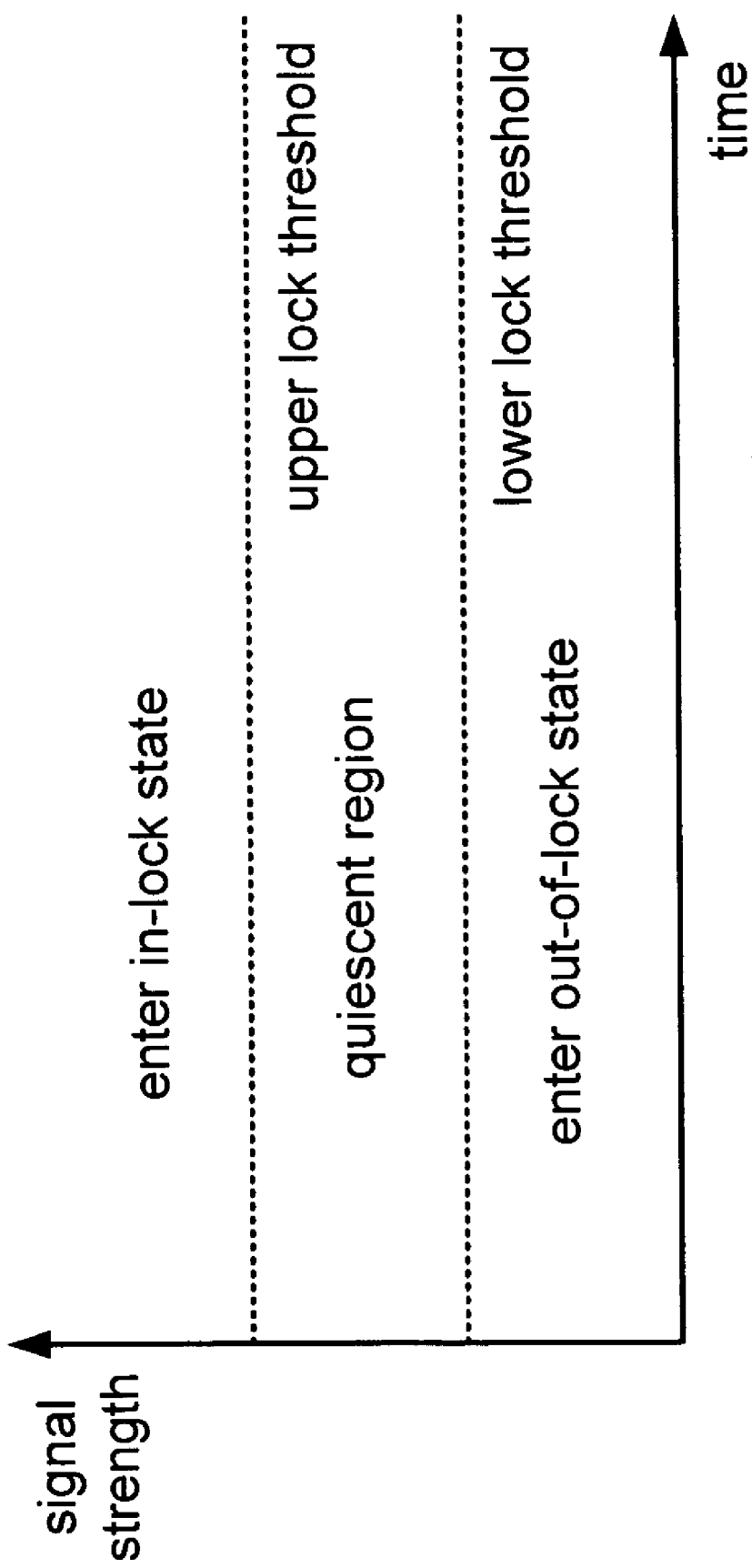
FIG. 2 shows a relation between finger lock thresholds and finger lock state.

Embodiments as described herein include novel and improved methods and apparatus that may be implemented to provide for an efficient decision regarding finger lock state in a spread-spectrum communication system. Exemplary embodiments described herein are set forth in the context of a CDMA communication system. While use within this context may be advantageous, the principles described herein may also be applied to embodiments that are incorporated in different environments or configurations.

In general, the various systems and apparatus described herein may be formed using integrated circuits, processors controlled by software and/or firmware, and/or discrete logic. The data, instructions, commands, information, signals, symbols, and chips that may be referenced throughout the application may be represented by voltages, currents, electromagnetic waves, magnetic fields or particles, optical fields or particles, or a combination thereof. In addition, the blocks shown in each block diagram may represent hardware or component operations of a method.

Unless expressly limited by its context, the term "obtaining" is used to indicate any of its ordinary meanings, including computing, calculating, measuring, estimating, sensing, receiving (from another device, for example), and retrieving (from a storage element, for example). Unless expressly limited by their contexts, the term "calculating" includes, in addition to its ordinary meanings, selecting a value (from a list or table, for example) according to a result of a computation or other calculation, and the term "calculated value" includes, in addition to its ordinary meanings, a value that is selected (from a list or table, for example) according to a result of a computation or other calculation.

In a typical CDMA receiving application, the quality of each tracked signal instance varies over time. For example, the response of a transmission channel corresponding to a received instance may change due to causes such as atmospheric effects, self-interference of the receiving device, interference from other devices, movement of the transmitter or receiver, and movement of people or objects within or near to the propagation path. Some of these causes may affect channels corresponding to different received instances, while in other respects the fading characteristics of the channels may remain independent.

It may be desirable to periodically evaluate the quality of a signal received over a path. For example, symbol estimates from weak signals tend to contain more noise than signal energy, so that it may be desirable to exclude such estimates from a combined symbol estimate. Thus, it may be desirable to obtain information regarding the quality of the various received instances so that a reasoned decision may be made regarding combining the corresponding symbol estimates. It may also be desirable to identify fingers that are no longer tracking viable instances and may be reassigned.

For each finger currently tracking a received instance, the rake receiver calculates a corresponding value of a signal quality measure. This signal quality value (also called "received signal strength indication" or RSSI) may be calculated within the corresponding finger or by another unit of the receiver. In a CDMA receiver, the RSSI is typically a measure of the ratio of incoming energy per chip $E_c$ (or per symbol $E_s$) to the total received power from that base station or sector $I_{or}$, or to the total received power $I_o$. The RSSI is commonly represented as a scaled measure of the finger's pilot energy per chip relative to the total received power spectral density, expressed as $E_c^p/I_o$. In one example, the RSSI is represented by the received signal energy on the pilot channel, which may be calculated as the squared magnitude of the complex received signal. In other examples, the RSSI may be represented by the received signal energy on another channel, such as a traffic channel.

Other methods that may be used to calculate the RSSI include a dB value estimation method as described in Luo et al., U.S. Publ. Pat. Appl. No. 2004/0176038, entitled "METHOD AND APPARATUS OF SIGNAL ESTIMATION OVER GENERALIZED FADING CHANNEL," published Sep. 9, 2004. The signal quality value may be calculated for each symbol, chip, or sample or may be calculated at some larger interval (for example, integrated over the interval or spot-calculated over a smaller period within the interval). The RSSI may also be filtered using, for example, a simple low-pass filter such as a first-order infinite-impulse-response (IIR) filter.

The RSSI may be used as a basis for the decision of whether to include a symbol estimate from the corresponding finger in a combined symbol estimate. This combining decision is commonly implemented by associating each operating finger in the rake receiver with a corresponding lock state, where the value of the lock state is based on the RSSI. The lock state is typically a binary value, such that the finger is either "in-lock" or "out-of-lock." A lock state of "in-lock" generally indicates that the pilot is successfully tracked and that the finger is receiving a valid instance of the signal. A lock state of "out-of-lock" generally indicates that the finger is tracking an instance that is too weak to be reliable and may also indicate a finger that is not currently assigned to any instance.

The value of the lock state may be used to control which symbol estimates are incorporated into the combined symbol estimate. For example, the lock state may be used to distinguish fingers with pilot powers so low that they would yield poor channel estimates and degrade demodulation performance, so that the outputs of these fingers may be excluded from the symbol estimate. A lock state of "out-of-lock" may also serve as a basis to free up fingers for reassignment. Alternatively, a different lock state variable may be maintained for each finger for purposes of assignment control, although the RSSI may also be used as a basis for this variable.

FIG. 2 shows a typical arrangement of upper and lower lock thresholds. To establish the lock state for a finger, one or both thresholds are compared to the finger's RSSI. If the RSSI is above the upper (or "in-lock") threshold, then the lock state of the finger is forced to the in-lock state. If the RSSI is below the lower (or "out-of-lock") threshold, then the lock state of the finger is forced to the out-of-lock state. Otherwise the RSSI is in the quiescent region, and the lock state of the finger remains unchanged.

The hysteresis thus provided by the upper and lower lock thresholds helps to keep strong paths in lock in a fading environment while keeping fingers from becoming locked by weak signals. Typical sets of respective values for the upper and lower lock thresholds include (−20.2 dB, −28 dB), (−20.2 dB, −27.6 dB), and (−20.2 dB, −24.6 dB), although any other values or representations may be used.

Especially for an implementation in which the RSSI is filtered, it may be desirable to select a value close to the upper lock threshold for a default RSSI value. One such example is −21.6 dB. A potential advantage of a high initial RSSI value is that it may allow a finger tracking a strong instance to get into lock sooner.

Figure 3A:
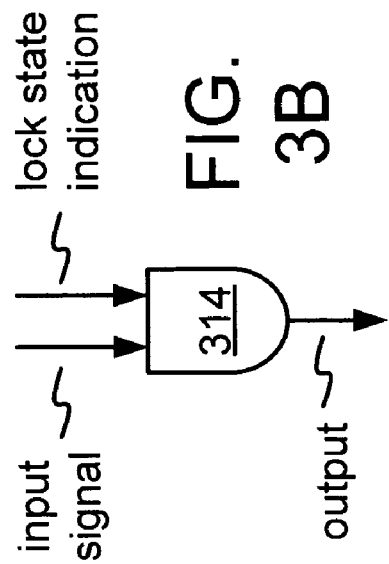
FIGS. 3A-D show several examples of control structures that may be used to apply an indication of lock state.

The finger lock state may be applied to control combining of the corresponding finger output into a combined estimate. FIGS. 3A-D show several examples of control structures that may be used with a lock state indication signal. For example, an indication of the lock state may be used as a gating signal to pass or block an input signal. FIG. 3A shows a configuration including an analog switch, in which a lock state indication signal controls the switch to output a selected one of the input signal and a zero signal. In these examples, the input signal may be a symbol estimate itself, or it may be a value that is to be applied to the symbol estimate, such as a channel response estimate or other weight. Control of a multi-bit signal in this fashion may be implemented by ganging several such switches together, with each switch receiving a different bit of the input signal at one input and with all switches receiving the lock state indication at the control input.

Figure 3B:
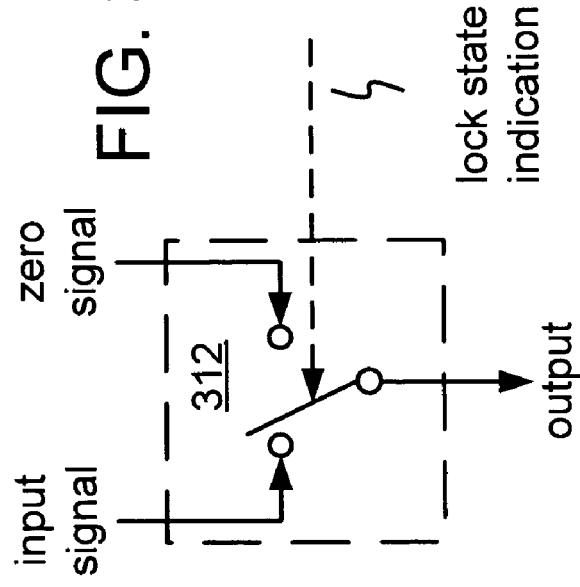

FIG. 3B shows a configuration including an AND gate, in which a lock state indication signal controls the gate to output the digital input signal or to output a digital low state. Control of a multi-bit signal in this fashion may be implemented by ganging several such gates together, with each gate receiving a different bit of the input signal at one input and with all gates receiving the lock state indication at the other input.

Figure 3C:
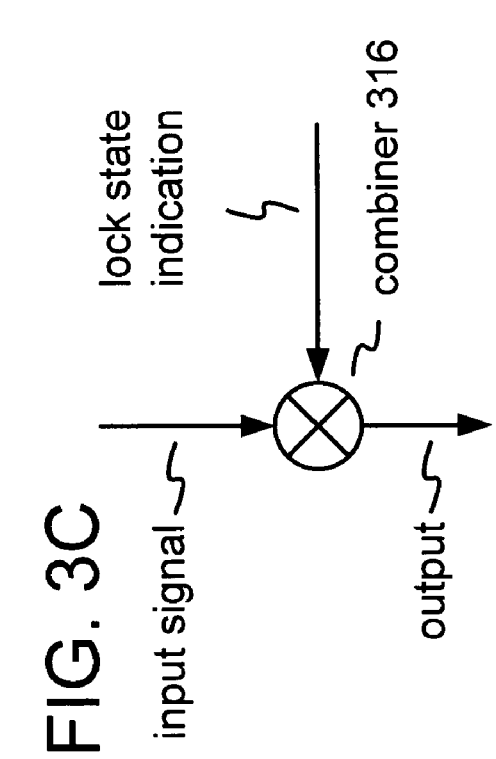

An indication of the lock state may also be used as a masking signal to mask the input signal. FIG. 3C shows such a configuration including a multiplier. Control using one or more AND gates as described above is one example of using a multiplier.

Figure 3D:
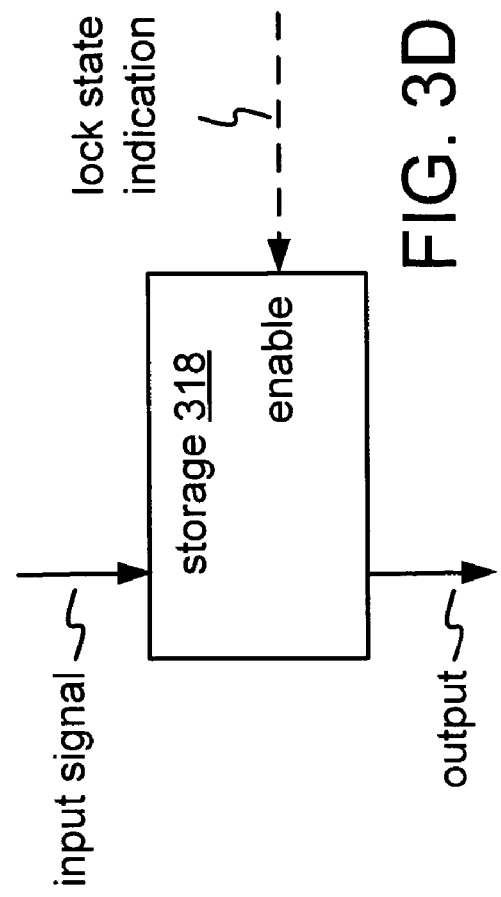

In another implementation, an indication of the lock state may be used as an enable signal, for example, to enable reading and/or writing a finger output value to a storage element such as a buffer. FIG. 3D shows a configuration in which the storage element receives the lock state indication at an enable input. In such an implementation, it may be desired to reset the storage element (for example, to a zero state) before the present operation, so that a previously stored value may be cleared. In one example of controlled storage, the lock state is implemented to control writing of symbols into a deskew buffer.

In receivers or fingers having such capability, the finger lock state may also be used to enable or disable a control loop, such as a time-tracking or frequency correction loop. For example, the loop may be enabled when the finger is in lock and disabled otherwise. For loop configurations in which an applied value (for example, a frequency correction value) is a composite of values obtained from more than one finger, values from the respective fingers may be included in or excluded from the combining operation based on the corresponding lock states.

A rake receiver may also use the lock state to support finger reassignment. For example, a control processor of the receiver may be configured to identify out-of-lock fingers in a triage operation and deassign them to be available for new assignments. In other implementations, a different lock state may be calculated for use in finger assignment, which calculation may involve comparing the RSSI to one or more lock thresholds that are different from those used in relation to symbol estimate combining.

The quality of the CDMA signal received from a particular base station or sector may be characterized by a geometry value. Geometry is a measure of a relation between the power received from the target cell and the total received power. In a CDMA network, the geometry measure is similar to an SNR measure for the base station, and it generally indicates how close the receiver is to the base station as opposed to other base stations. Geometry may be expressed as $I_{or}/I_{oc}$, where $I_{or}$ denotes the total received power from that base station or sector, $I_o$ denotes the total received power, and $I_{oc}=I_o-I_{or}$, denotes the power received from other sources (interference). A high geometry value (for example, 20 dB) may indicate a position close to the base station, while a low geometry value (for example, −3 dB) may indicate a position close to the cell border.

Figure 4:
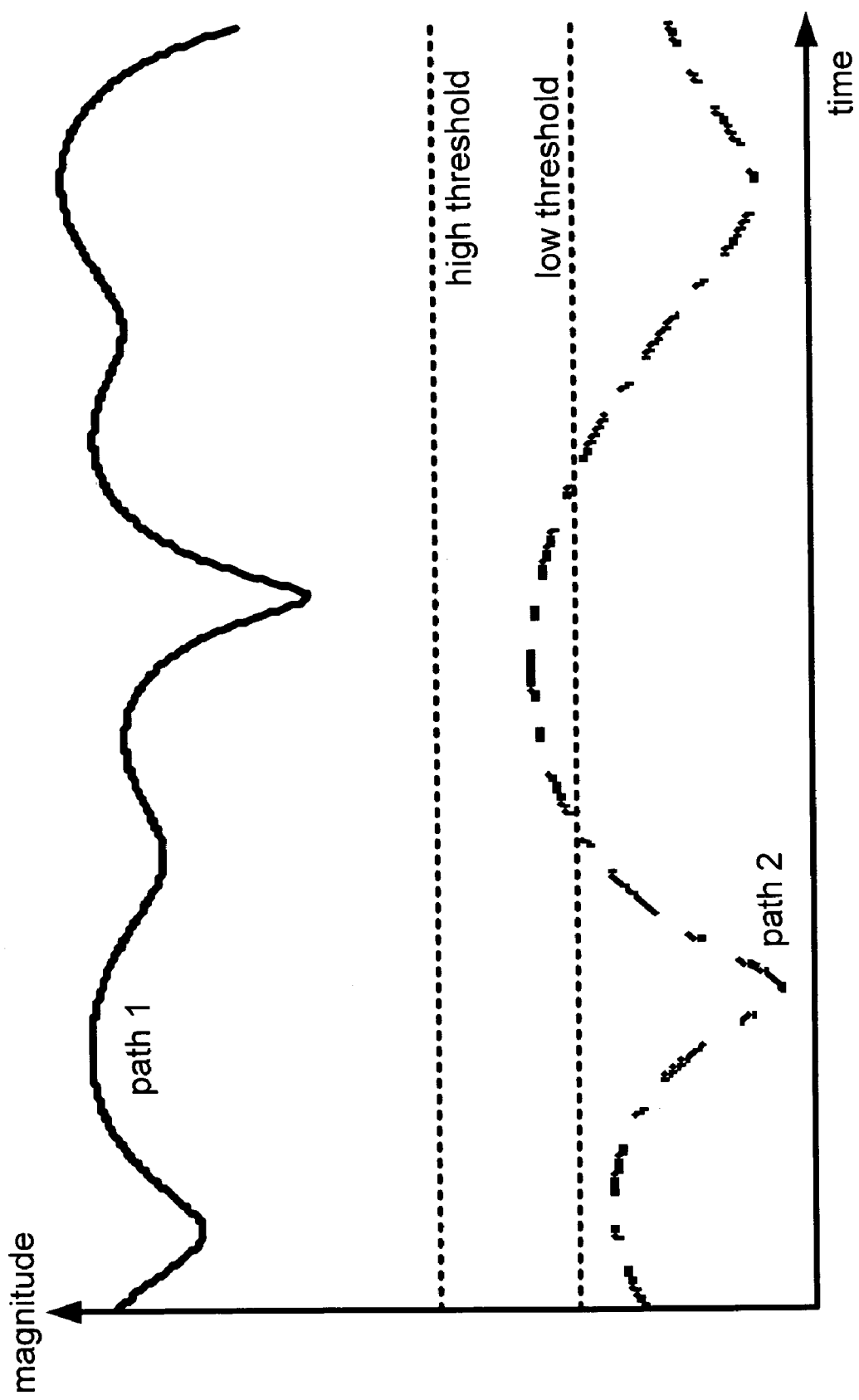
FIG. 4 shows relative signal quality values of two received instances over time in an example of a high-geometry situation.

In a high-geometry situation, the strongest instance may be received via a line-of-sight path, and reception of strong multipaths is less likely. FIG. 4 shows an example of the relative RSSIs of two received instances in a high-geometry situation. For convenience of illustration, the instances in the attached figures are shown as deskewed in time relative to one another. In this example, the instance received via one path (path 1) has a signal quality measure that is much higher than any other received instance, and the finger tracking it remains in lock across the entire period shown. Although the next strongest instance (received via path 2) is briefly strong enough to rise above the low lock threshold, the finger tracking this instance is out of lock across the entire period.

As opposed to a receiver located close to one base station and far from others, a receiver at the edge of a sector is likely to receive more equal power from different base stations. Low-geometry environments are typically observed at the fringes of coverage (at the edge of the sector, for example, close to handoff), inside a building or other enclosed structure, or within an urban canyon. As the margin between any received instance and the noise floor is typically low in such an environment, it may be desirable to combine energies from any valid paths that can positively contribute to the demodulation result and overcome the noise.

Figure 5:
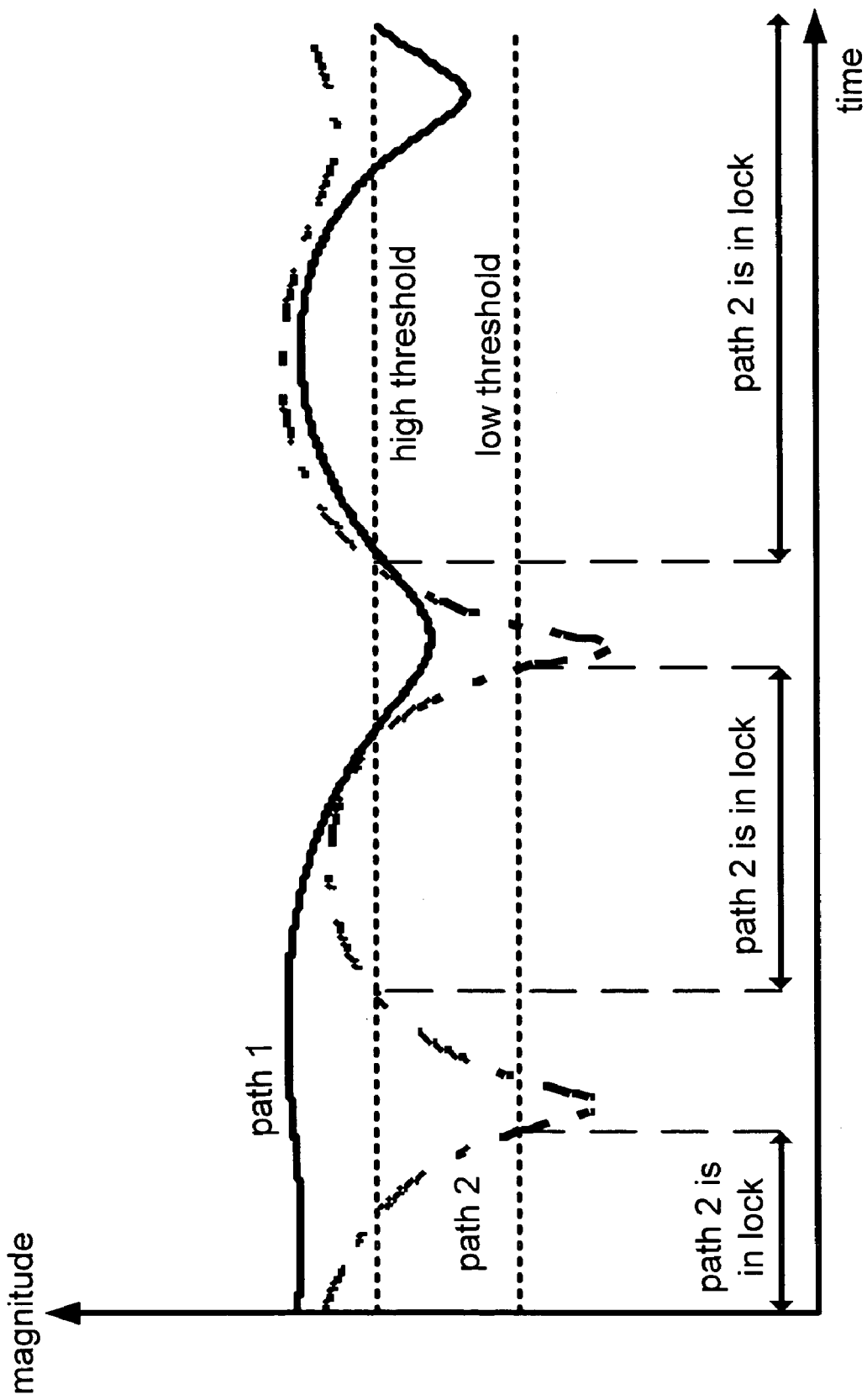
FIG. 5 shows relative signal quality values of two received instances over time in an example of a low-geometry situation.

FIG. 5 shows an example of a low-geometry situation. In this example, the instance received via path 1 remains strong enough for the finger tracking it to stay in lock, although its signal quality value dips below the high lock threshold. As noted on the figure, the finger tracking the instance received via path 2 is also in lock for most of the period shown, such that symbol estimates from this finger which correspond to those intervals may be combined with those from the finger tracking path 1.

The relative benefit of combining a symbol estimate from a secondary path may vary greatly with geometry. If the strongest received instance has a RSSI of −3 dB, for example, combining its symbol estimate with one from an instance with a RSSI of −23 dB will yield a combined $E_c/I_0$ of −2.96 dB, or only 0.04 dB better. If the RSSI of the strongest received instance is only −23 dB, however, then combining its symbol estimate with just one more from a finger at −23 dB will yield a 3 dB gain in $E_c/I_o$.

It may be desirable to select lock thresholds that keep useful signals in lock while excluding signals that are likely to detract from the overall SNR. For example, the upper and lower lock thresholds may be selected according to a desired balance between the likelihood of excluding paths that would degrade the combined output in a high-geometry situation and the likelihood of including paths that may add signal energy in a low-geometry situation. The threshold values may be selected based on theory and/or observation, such as laboratory and/or field tests. Several examples of lock threshold values are given above.

As noted above, symbol estimates from weak received instances of the signal may degrade a combined estimate by adding more noise than signal energy. Symbol estimates from some strong received instances, however, may also degrade a combined estimate. For example, a strong instance may sometimes result from a spurious signal that adds more noise than signal energy, and it may also be desirable to exclude symbol estimates corresponding to such signals. A finger tracking a spurious signal that is associated with a valid instance, such as an interference that varies with the level of the valid instance, may go into lock when the valid instance is strong. One example of such a signal is a received instance due to a sidelobe of a filter response.

Figure 6:
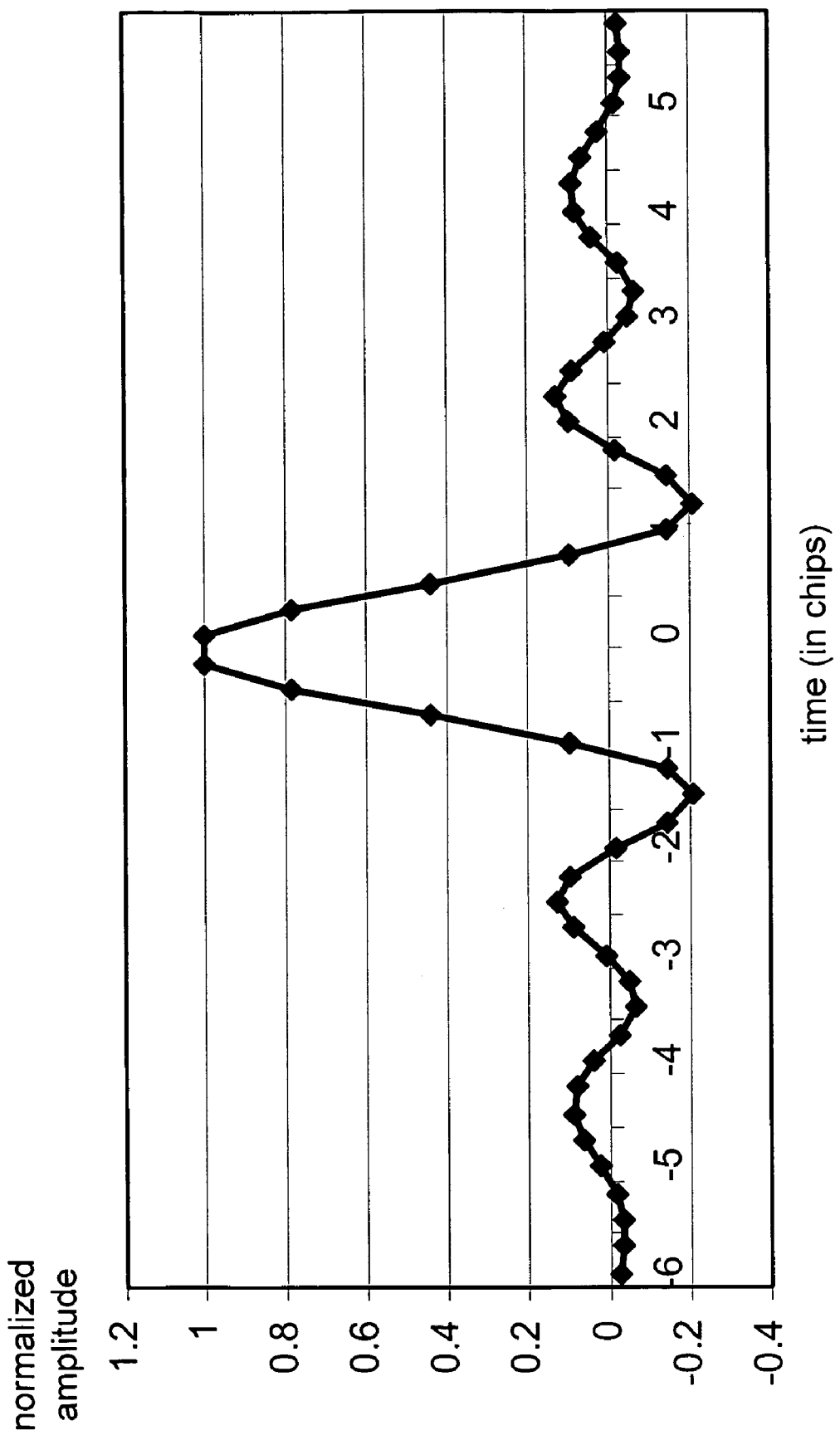
FIG. 6 shows a plot of a time-domain impulse response for a baseband filter.
Figure 7:
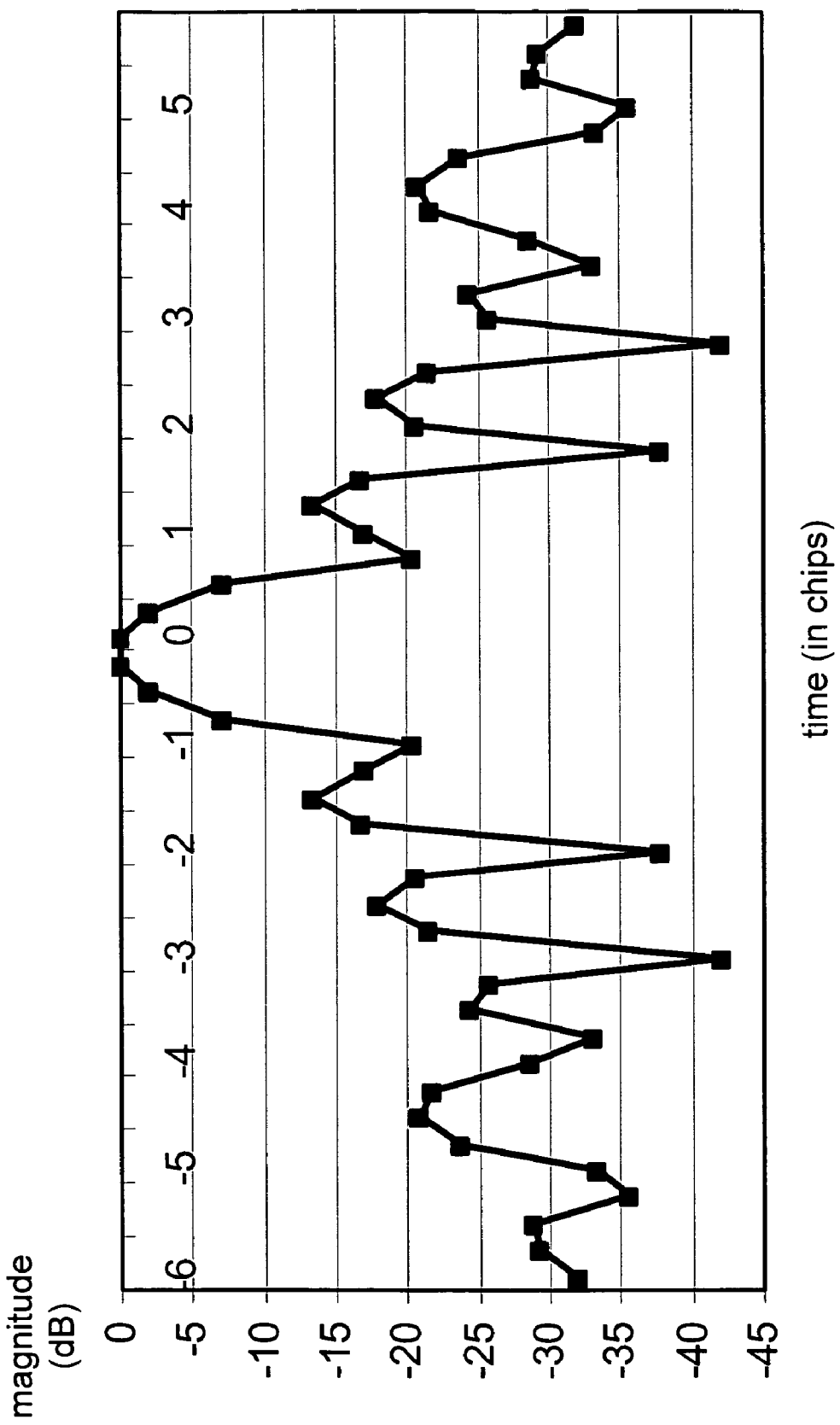
FIG. 7 shows a plot of the magnitude of the time-domain response of FIG. 6.

At the transmitter, a CDMA signal will typically pass through a pulse-shaping filter to reduce out-of-band emissions. A matched filter to the pulse-shaping filter may also be applied at the receiver, and the overall response may be modeled as a convolution of the responses of the two filters. FIG. 6 shows the impulse response of a composite transmit/receive filter in the time domain, and FIG. 7 shows the magnitude response of this filter over time.

As may be seen in these figures, the response of this filter includes sidelobes in time. FIG. 7 shows that the first sidelobes occur 1.5 chips away from the main peak and are approximately 14.5 dB below the mainlobe, and the second sidelobes occur 2.5 chips away from the main peak and are also within 20 dB of the mainlobe. When a valid received instance is strong, spurious instances due to these sidelobes may also be strong. A rake receiver may assign a finger to such an instance, and its RSSI may be strong enough to put the finger into lock, thus allowing its symbol estimate to degrade the combined symbol estimate. It is desirable to unlock fingers that are tracking noise or sidelobes, as either of these can degrade demodulation performance.

Over time, it is possible that the receiver may self-correct the problem of tracking a sidelobe. For example, a time-tracking loop may eventually cause a finger tracking a sidelobe to track to the mainlobe, at which point it may be reassigned to another useful path if one exists. With the time needed to complete the process of convergence, detection, and reassignment, however, a delay of several or many symbols may occur until the finger is tracking a valid instance. In the meantime, the call may be dropped if the instance or instances being tracked are too weak.

A time-based solution may be used to exclude an estimate due to a sidelobe from the combined symbol estimate. Such a solution may include preventing the assignment of fingers to paths that are about 1.5 (and/or about 2.5) chips away from the strongest path, or otherwise excluding estimates corresponding to paths at these time locations from contributing to the combined symbol estimate. A time-based solution may be implemented, for example, by modifying the finger assignment algorithm in the searcher. However, the resolution in time of the searcher is typically insufficient to support such a distinction reliably. Such an operation may also be rather indiscriminate and may exclude viable paths occurring at these time locations.

Other complicated solutions to remove sidelobes are also possible. The receiver may be configured to perform an equalization on the received signal, for example, according to the measured and/or estimated frequency response of one or more filters or other features in the signal path. However, such operations to remove the sidelobe responses from the received signal may be impractical and/or otherwise undesirable in terms of execution time, power consumption, design complexity, and/or predictability of system behavior.

Figure 8:
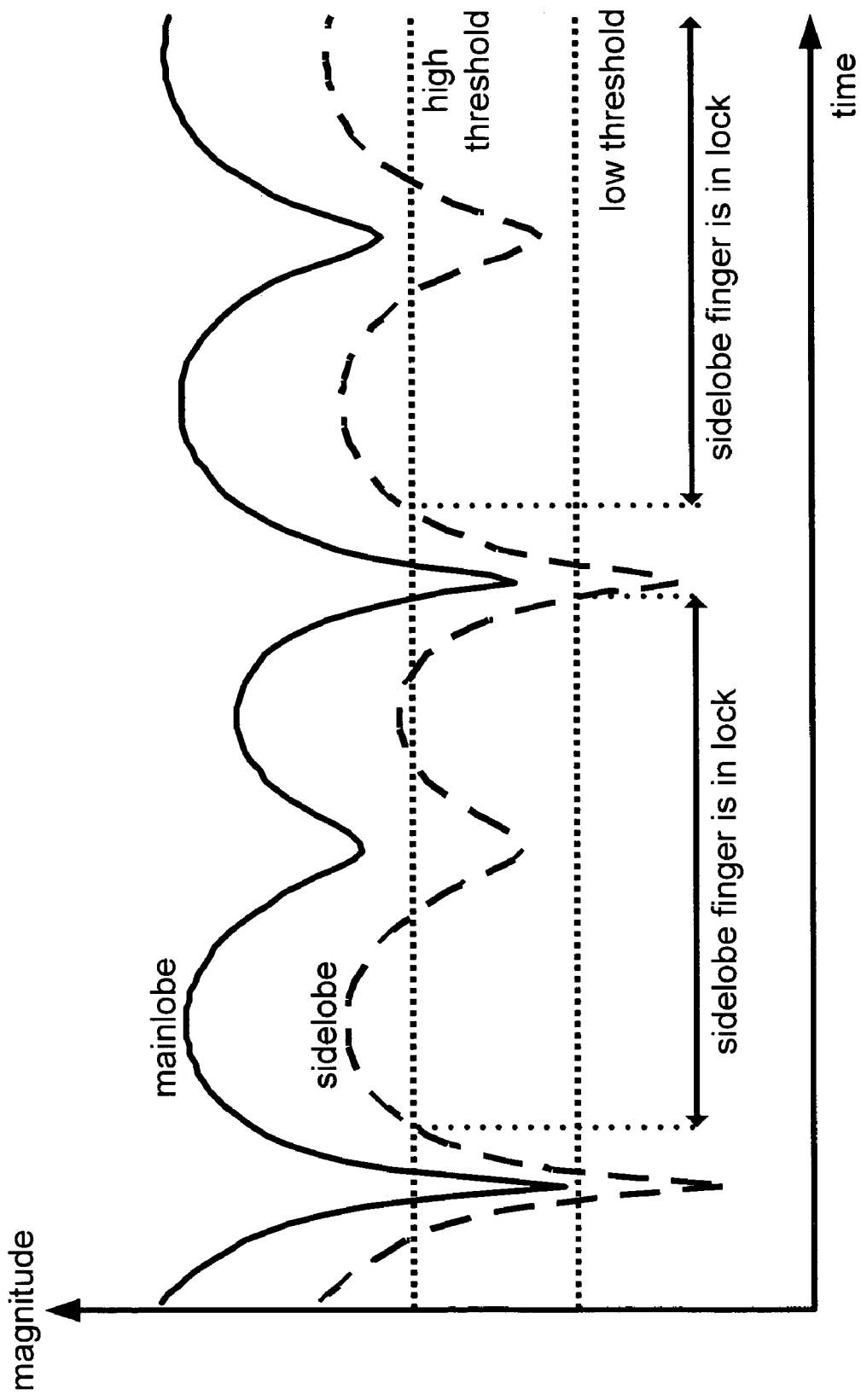
FIG. 8 shows relative signal quality values over time for received instances corresponding to a mainlobe and a corresponding sidelobe.

Sidelobe issues typically arise in high-geometry situations. FIG. 8 shows the signal quality over time for received instances resulting from a mainlobe and a corresponding sidelobe in a high-geometry situation. For convenience of illustration, these instances are shown as deskewed in time relative to one another. As the RSSI of the instance received via the main path in a high-geometry situation is likely to be well above the upper lock threshold, the RSSI of a tracked instance corresponding to a first or even a second sidelobe will also tend to be above that threshold.

By removing a source of interference, sidelobe rejection in a high-geometry situation may improve the SNR of the combined symbol estimate significantly. Consequently, the UE may transmit a power control message instructing the base station to reduce its transmit power on the traffic channel. By supporting a lower ratio of energy per chip on the traffic channel to total transmitted power ($E_c'/I_{or}$), sidelobe rejection may thus help to improve network capacity. Advantages associated with reducing transmit power are especially significant in high-geometry situations, as high data rates are usually transmitted in such situations. Another potential advantage is that the finger is available to track another valid path.

It may be desirable to select a pair of finger lock thresholds that are expected to provide good performance in both high- and low-geometry situations. For example, the lock thresholds may be selected according to a desired balancing between sidelobe exclusion in a high-geometry situation and multipath inclusion in a low-geometry situation. The lock thresholds may be selected according to a tradeoff between the energy needed from each finger (e.g. to keep the time-tracking loop in lock) and the desired degree of sidelobe rejection. Lock decision operations may be performed by a control processor of the receiver. For example, lock decision operations may be implemented as one of a number of tasks performed by a microprocessor.

Figure 9:
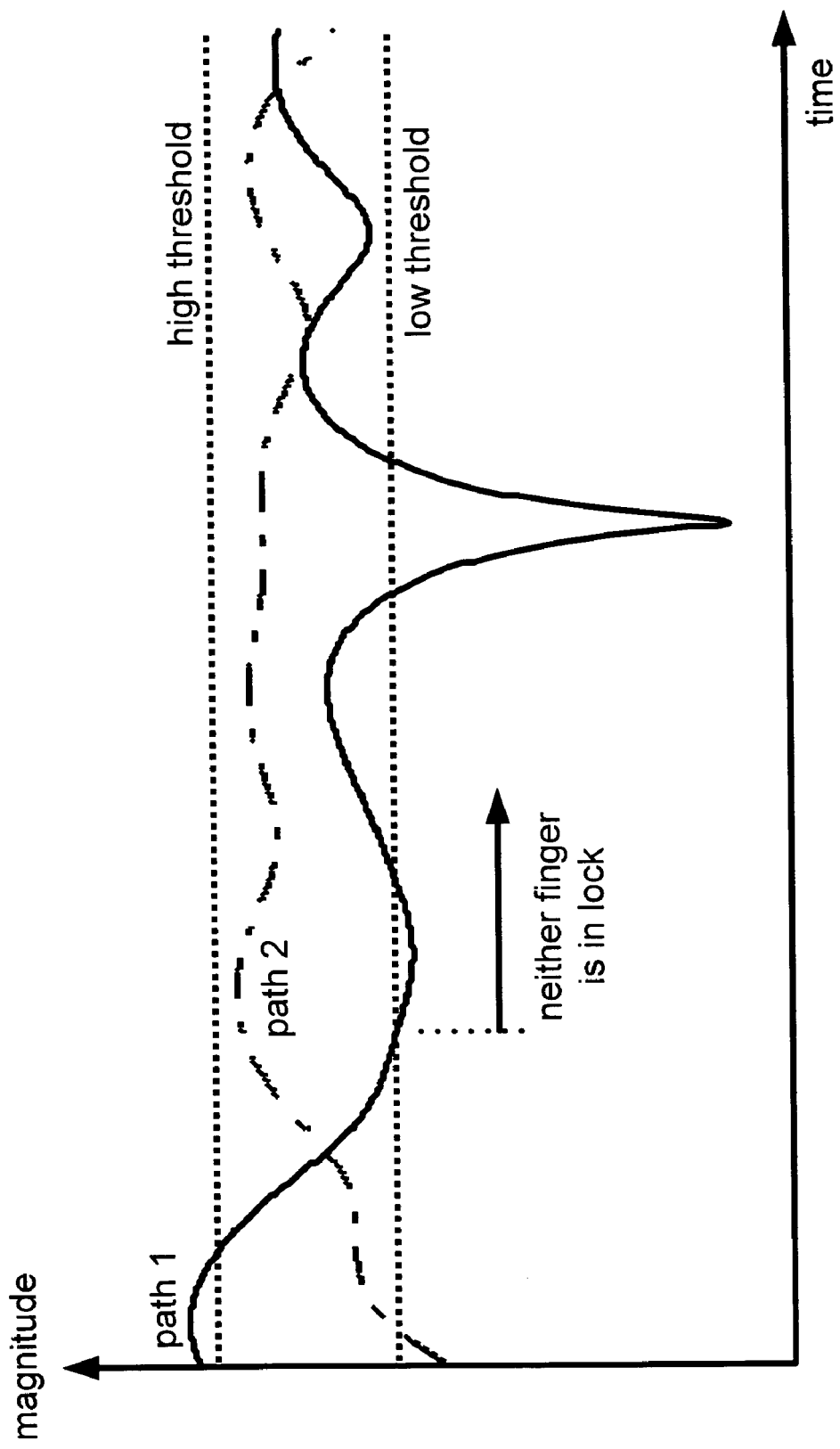
FIG. 9 shows relative signal quality values of two received instances over time in an example of a low-geometry situation.

Unfortunately, a set of upper and lower lock thresholds that provides good sidelobe exclusion may also cause exclusion of viable paths in a low-geometry situation and thus lead to traffic calls that are dropped unnecessarily. FIG. 9 shows an example of two received instances in a low-geometry situation. Although the pilot signal of the instance received via path 1 may remain decodable across much of the period shown, the RSSI does not cross the upper threshold after it falls below the lower threshold, and the finger remains out of lock. Although the instance received via path 2 is actually the stronger one during most of this period, its RSSI is not strong enough to pass the upper threshold, and thus this finger remains out-of-lock as well. For most of the period shown, neither finger is in lock, and the call may be dropped unnecessarily.

A fixed set of lock thresholds that is optimal for one situation may be inappropriate for best performance in another situation. One possible solution is for the receiver to switch between different sets of lock thresholds depending, for example, on a measure of the present geometry. However, such a solution may be complicated to implement and/or may lead to unpredictable system behavior.

The problem of lock threshold selection may become even more complicated in systems that are configured for receive diversity. A receive diversity system produces a combined symbol estimate that is based on signals received via different antennas.

A receiver with receive diversity capability has more than one radio-frequency (RF) receive chain, each with its own antenna. Such a receiver produces multiple symbol estimates from different antennas that are then combined. The fingers processing the baseband digital signal from each receive chain may be drawn from a common pool of fingers, or each receive chain may feed a dedicated set of fingers. Likewise, finger assignments may be performed by a common control unit, or finger assignments for each receive chain may be handled independently by, for example, a respective searcher.

Symbol estimates from the fingers assigned to each receive chain of a receive diversity system may be combined separately, with the composite estimates from each receive chain being combined into an overall symbol estimate. Alternatively, a combiner may receive estimates directly from fingers assigned to more than one of the receive chains. For example, one combiner may receive estimates directly from all of the fingers.

In a receive diversity application, more than one antenna may receive an instance over the same path, and signal strength may be measured separately for each antenna on the same path. A potential advantage of such an arrangement is support for operation at lower SNRs. In a two-antenna receive diversity system, for example, it may be possible to operate with a SNR that is 3 dB lower. To make use of this advantage, it may be desired to reduce the lock thresholds for each path by 3 dB, so as to capture more energy in weak paths without reducing the combined total for each path.

Unfortunately, while the level of energy needed from a received instance may be lower in a receive diversity system, adding another antenna does not change the relation between mainlobe and sidelobe strength. Lowering the lock thresholds to take advantage of receive diversity would thus tend to make the problem of sidelobe exclusion worse, because it would increase the likelihood that a sidelobe of a stronger path would be tracked. In a receive diversity system, balancing sidelobe exclusion against signal inclusion may become even more difficult.

Figure 10:
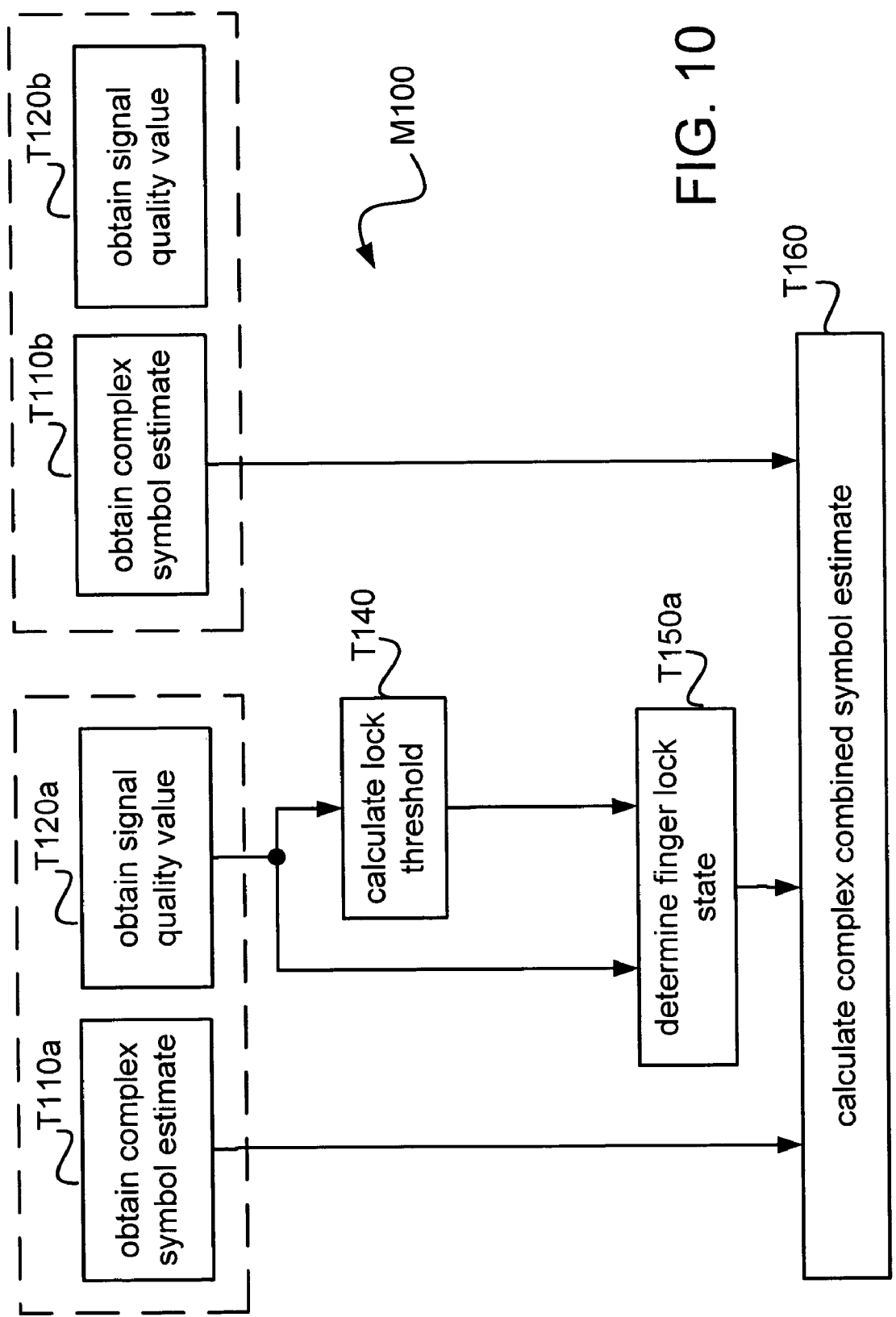
FIG. 10 shows a flowchart of a method M100 according to an embodiment.

FIG. 10 shows a flowchart of a method M100 according to an embodiment. Method M100 includes operations relating to n received instances of a transmitted signal, where n has a value of 2 or more and is typically 4, 6, 8, 12, or 16. For each of the received instances, a corresponding instance of task T110 obtains a complex-valued estimate of a symbol carried by the transmitted signal, and a corresponding instance of task T120 obtains a signal quality value for the received instance. In the example of FIG. 10, tasks T110*a* and T120*a* obtain values calculated from one received instance of a signal, and tasks T110*b* and T120*b* obtain values calculated from another received instance of the signal.

For each of the received instances, method M110 may also be configured to perform a corresponding instance of task T170, which obtains an estimate of the response of the corresponding transmission channel. The estimated channel response, which may be based on a pilot channel of the received instance, is a complex value that represents a rotation and scaling caused by the path via which the instance was received.

Figure 11:
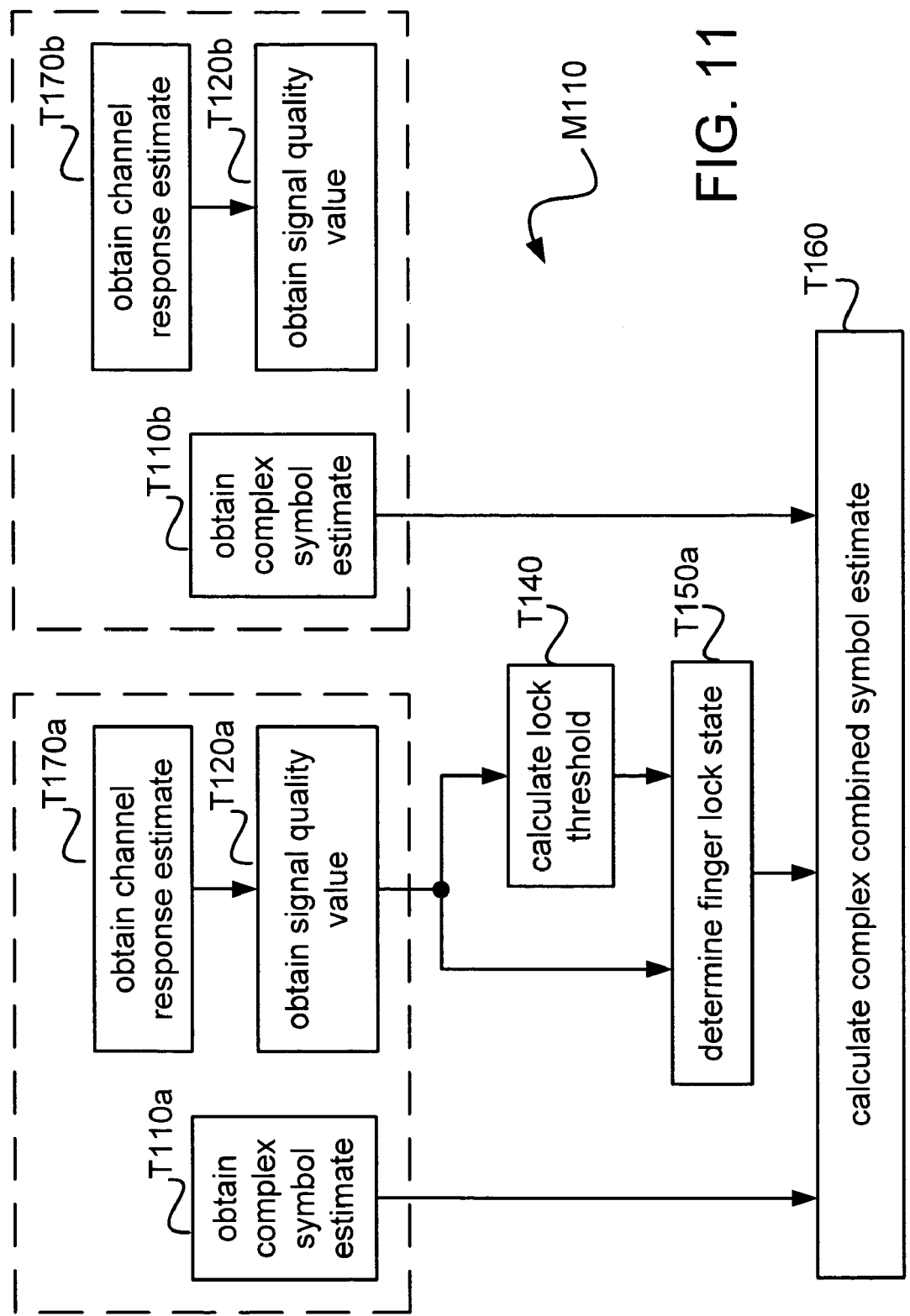
FIG. 11 shows a flowchart of an implementation M110 of method M100.

FIG. 11 shows a flowchart of an implementation M110 of method M100, in which the signal quality value obtained in each instance of task T120 is based on the estimated channel response obtained in the corresponding instance of task T170. For example, task T120 may be configured to perform an energy calculation based on the estimated channel response.

Figure 12:
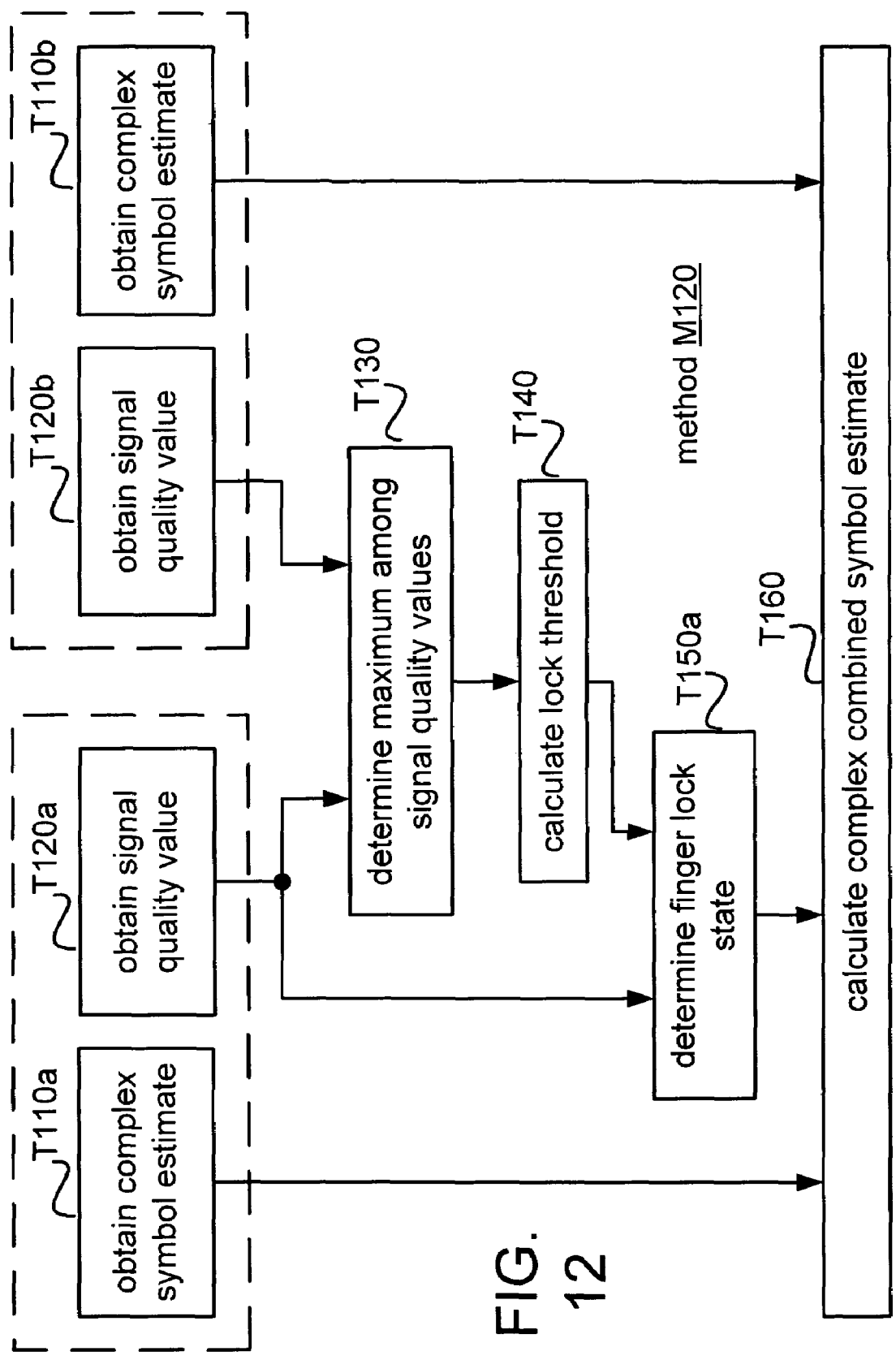
FIG. 12 shows a flowchart of an implementation M120 of method M100.

Based on at least one of the signal quality values, task T140 calculates a lock threshold. For example, task T140 may be configured to calculate the lock threshold based on a maximum among the signal quality values. FIG. 12 shows a flowchart of an implementation M120 of method M100 that includes a task T130. In this implementation, task T130 determines a maximum among the signal quality values, and task T140 calculates a lock threshold relative to the maximum. In one example, the signal quality values and the lock threshold are expressed in units of decibels (dB).

Task T140 may be configured to calculate the lock threshold T relative to the maximum signal quality value according to an expression such as $$T = G \max_{i \in F}\{RSSI_i\} \text{ or } T = \max_{i \in F}\{RSSI_i\} - L,$$

where F denotes the set of fingers, G denotes a gain factor less than unity, and L denotes an offset value that may be expressed in dB. The value of G and/or L may be selected or determined based on one or more known or estimated characteristics of the system, such as statistics of sidelobe distribution. For example, the value of G and/or L may be selected or determined based on a difference in magnitude between the mainlobe and a sidelobe in the response of a particular filter or filters in the signal path. In one example, the factor G has a value of 0.1.

Task T140 may be configured to select a value for the relative lock threshold from a list or table, as indexed by the maximum signal quality value or a portion thereof. Task T140 may also calculate or select the threshold value based on additional factors such as the number of available fingers; the number of pilot, traffic, and/or other channels to be received; and/or the level of the noise floor. If more fingers are available, the threshold value may be set lower. If more channels are to be received, the threshold may be raised so that fingers may be available to track strong instances on other channels. If the noise level rises, the threshold may be raised accordingly. Changing the threshold calculation in such examples may include changing the value of G and/or L.

For at least one of the received instances, method M100 includes a respective instance of task T150 that determines a lock state of the corresponding finger, based on a relation between the corresponding signal quality value and the relative lock threshold. Task T150 may be configured to compare the signal quality value for the instance (or a value based on the signal quality value) to the relative lock threshold. For example, task T150 may be configured to assign a lock state of "in-lock" to fingers whose corresponding signal quality values are not less than the lock threshold, and to assign a lock state of "out-of-lock" otherwise.

Figure 12A:
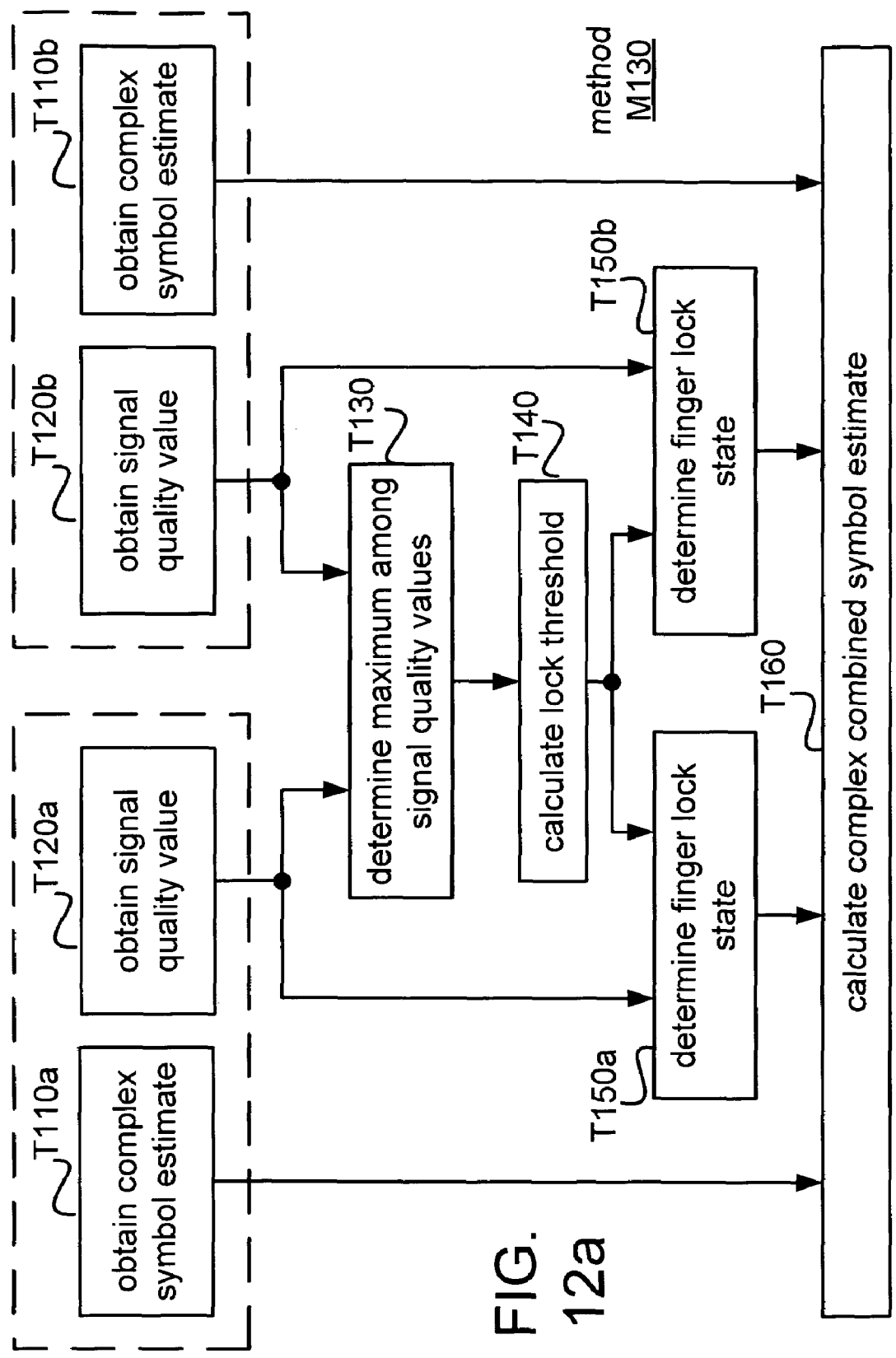
FIG. 12a shows a flowchart of an implementation M130 of method M100.

Method M100 may be implemented to include an instance of task T150 for each of the received instances. FIG. 12a shows a flowchart of one such implementation M130 of method M100. Alternatively, method M100 may be implemented to perform an instance of task T150 for each of the received instances except the one having the maximum signal quality value. In such case, the finger corresponding to the maximum signal quality value may be assigned a lock state of "in-lock".

Based on the complex-valued symbol estimates and finger lock states, task T160 coherently combines at least some of the symbol estimates to obtain a complex-valued combined symbol estimate. Task T160 may be configured to include each symbol estimate in the combined symbol estimate or to exclude it depending on the corresponding lock state. In some implementations, task T160 is configured to include the symbol estimate from the finger having the maximum signal quality value regardless of its corresponding lock state. Task T160 may also be configured to combine the estimates by adding the other symbol estimates into the estimate corresponding to the maximum signal quality value.

Method M100 may also be configured to alter the phase of a symbol estimate based on the corresponding estimated channel response. In some such implementations, method M100 is configured to apply the estimated channel responses to the symbol estimates to compensate effects of each transmission channel such as scaling and/or phase rotation. For example, method M100 may be applied to multiply the symbol estimate of each instance with the complex conjugate of the corresponding estimated channel response. In another example, method M100 is configured to coherently demodulate the symbol estimate by performing a dot product and a cross product of the symbol estimate and the estimated channel response. Such an operation may be performed before the symbol estimates are combined in task T160, and it may be performed for all instances or, alternatively, only for instances with corresponding lock states of "in-lock."

Before task T160 combines the symbol estimates, it may be desirable to deskew them relative to one another. Deskewing may be performed on the estimates at symbol resolution or at chip resolution as described, for example, in Prysby et al., U.S. Pat. No. 6,888,878, entitled "SIGNAL COMBINING WITHIN A COMMUNICATION SYSTEM," issued May 3, 2005, in FIG. 7 and at column 6.

In coherently combining the symbol estimates corresponding to fingers in lock, task T160 may be configured to weight the estimates equally. Such an operation is called equal-gain combining. Alternatively, task T160 may be configured to apply different weights to the various symbol estimates. For example, task T160 may be configured to apply weights that are based on the pilot powers or SNRs of the respective instances. A combining operation that applies weights to maximize the SNR of the combined output is called maximal-ratio combining. In one example, task T160 is configured to apply, to each of at least the symbol estimates to be combined, a weight based on the respective RSSI. It may be desired to exclude some symbol estimates (such as those having a magnitude below a threshold value) from the combined estimate. In a further example, another task in the implementation of method M100 is configured to apply respective weights to each of the symbol estimates. Alternatively, such a task may be configured to apply respective weights only to the symbol estimates that will be included in the combined estimate.

Figure 13:
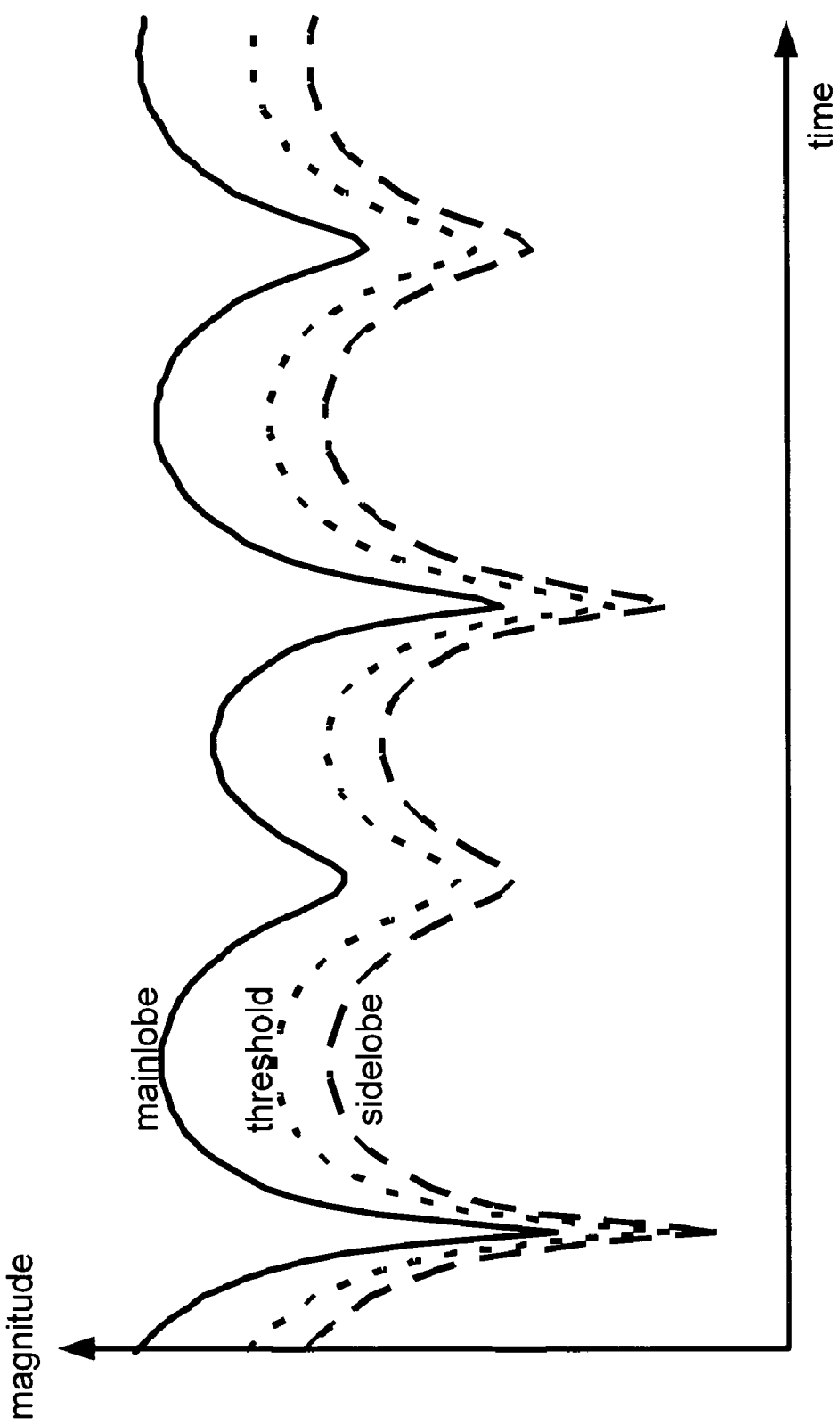
FIG. 13 shows an application of method M100 to the high-geometry scenario shown in FIG. 8.

FIG. 13 shows an application of method M100 to the high-geometry scenario shown in FIG. 8, where the mainlobe and sidelobe signals are again deskewed. In this case, the lock threshold varies with the strength of the mainlobe instance. The finger tracking the instance due to associated sidelobe is reliably kept out of lock, even though that instance is strong during some intervals.

Figure 14:
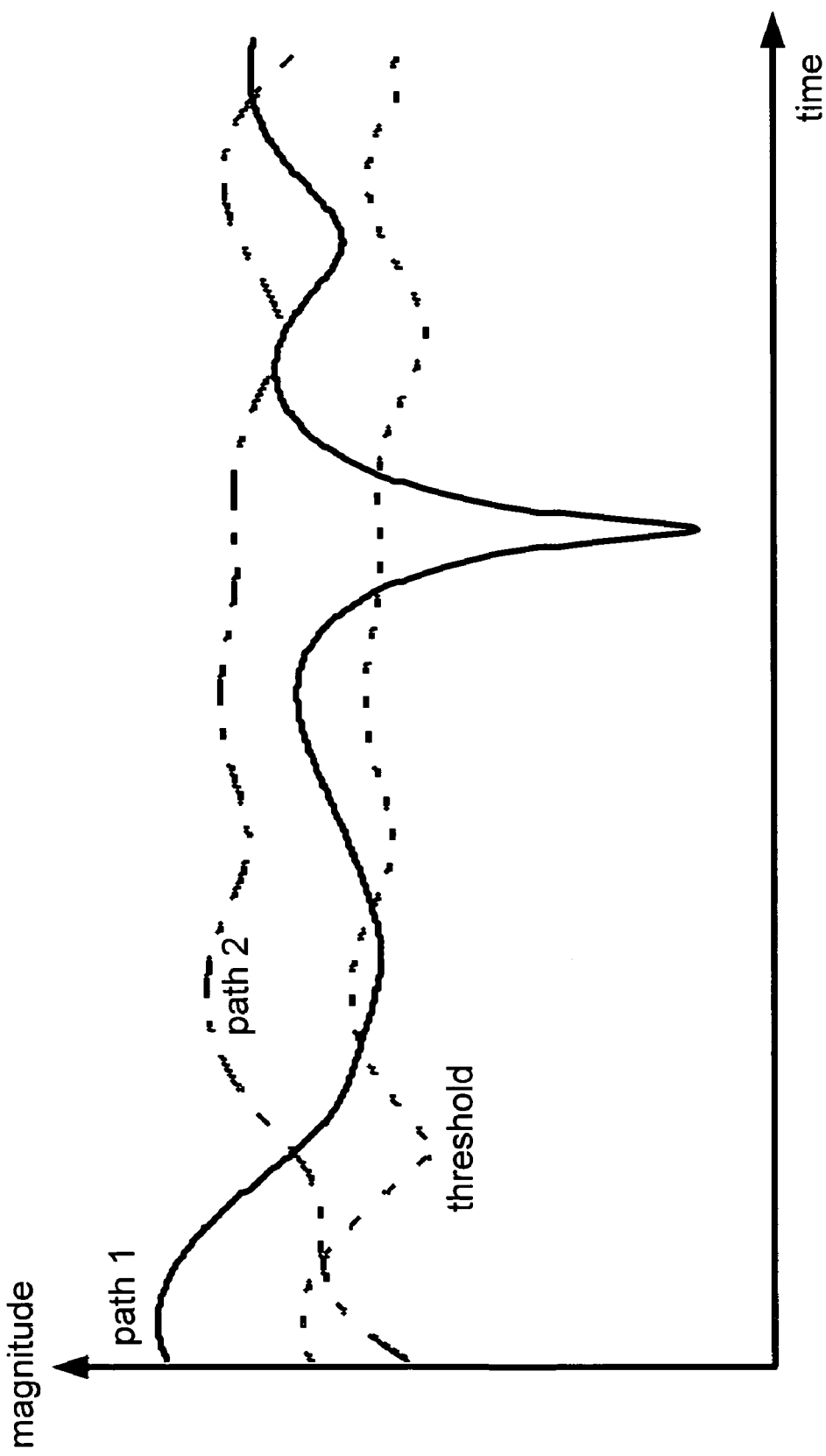
FIG. 14 shows an application of method M100 to the low-geometry scenario shown in FIG. 9.

FIG. 14 shows an application of method M100 to the low-geometry scenario shown in FIG. 9. In this case, the lock threshold is relative to the RSSI of the strongest instance, whose identity changes over the period shown. The finger tracking the strongest instance remains in lock, and over most of this period the fingers tracking both instances are in lock.

Figure 15:
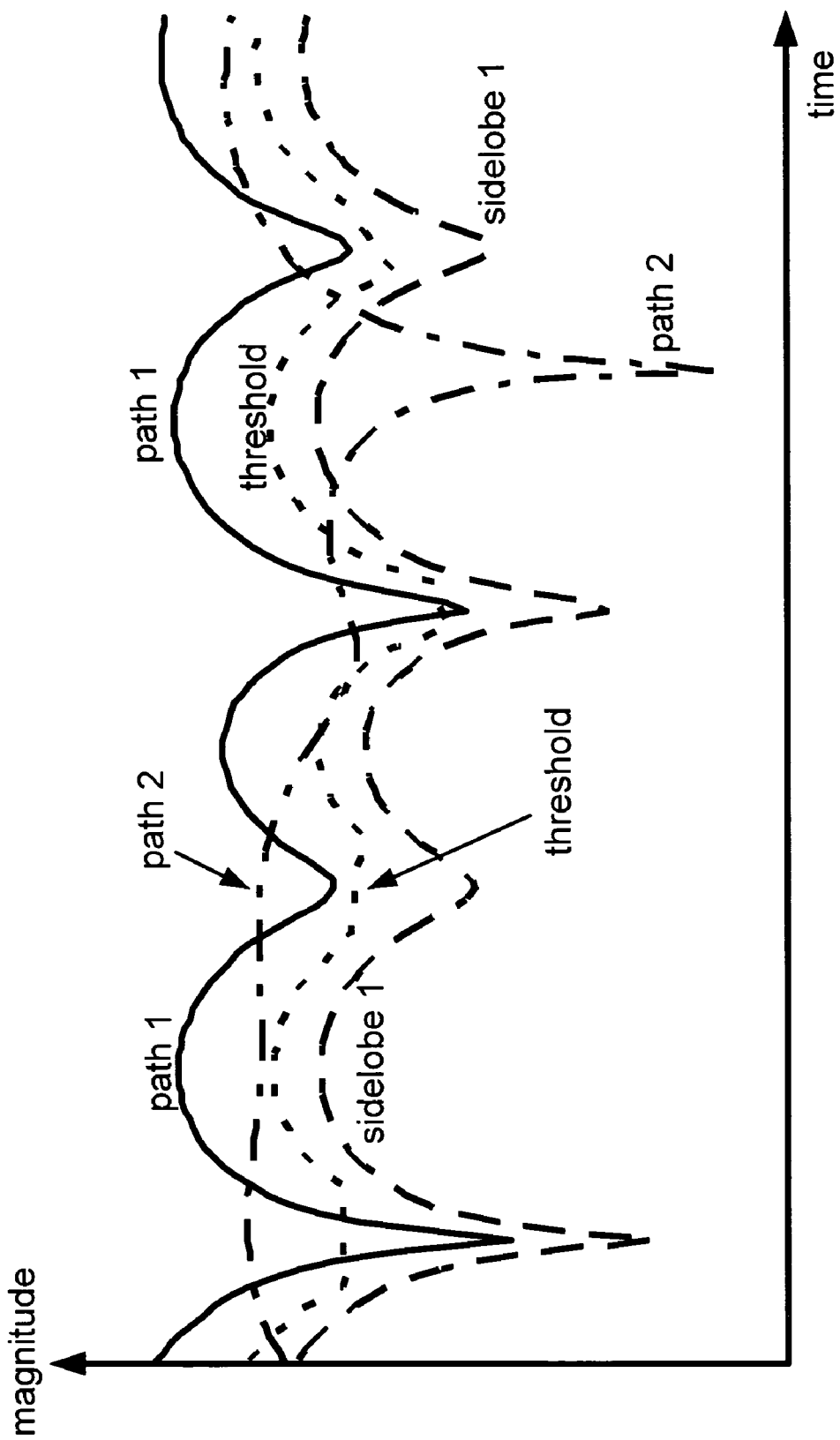
FIG. 15 shows a relative lock threshold being applied to fingers tracking two different multipath instances.

Method M100 may be implemented to allow for a fast response, such as in a fast fading environment. In existing methods that use dual lock thresholds, a finger's current lock state is constrained in part by its past lock state. One potential advantage of method M100 is that it may be configured to update the relative lock threshold at every symbol. For example, such a configuration may vary the relative lock threshold according to the strongest instance currently being received. FIG. 15 shows an example of the relative lock threshold for such a case in which the identity of the strongest path changes frequently over the period shown. Application of method M100 in a receive diversity system may also improve performance significantly in a fading environment.

It may also be desirable to implement task T140 to impose a lower bound on the relative threshold, such that instances too close to the noise floor may be excluded regardless of the strength of the strongest instance. For example, task T140 may be configured to calculate the relative threshold T according to an expression such as the following:

$$T = \max\{B, G \max_{i \in F}\{RSSI_i\}\} \text{ or } T = \max\{B, \max_{i \in F}\{RSSI_i\} - L\},$$

where B denotes the lower bound. In such case, task T140 may calculate a value for B according to an expression such as B=g×NF or B=NF+l, where NF denotes the noise floor as measured and/or predicted, g denotes a gain factor not less than unity, and l denotes an offset value not less than zero, which may be expressed in dB.

In a further case, the relative threshold is implemented as an upper lock threshold, and task T150 is further configured to apply a lower lock threshold. The lower lock threshold may have a value that is fixed, or it may have a value that is variable relative to the relative upper lock threshold and/or the noise floor. For example, the lower lock threshold may be adjusted according to the noise floor in different frequency bands.

In a further implementation of method M100, information regarding a finger lock state as determined in task T150 is made available to a searcher, assignment algorithm, or control processor executing such an algorithm. For example, such information may be applied by such an element to exclude an instance due to a sidelobe from being reassigned, even if it has a relatively strong signal quality value. For example, an assignment decision may be based on an observation that the finger tracking that instance has remained out of lock for a period of some predetermined length. In another implementation, a searcher or control processor is configured to calculate a threshold relative to a maximum among signal quality values and to assign fingers to various received instances according to the relative threshold.

Figure 16:
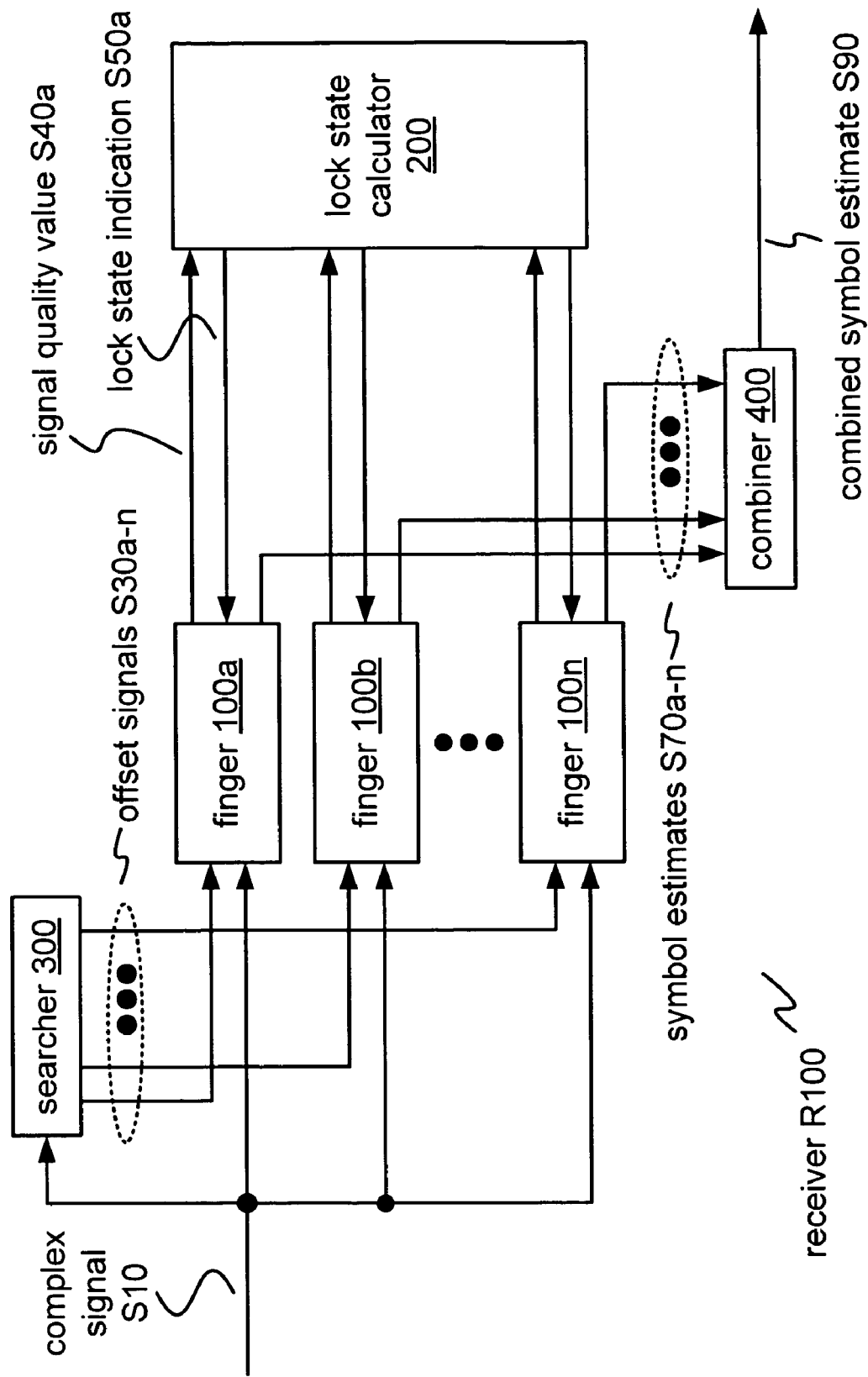
FIG. 16 shows a block diagram of a receiver R100 according to an embodiment.

Embodiments include receivers having a set of fingers, each finger in the set being configured to perform a coherent demodulation on a complex-valued representation of a transmitted signal. FIG. 16 shows a block diagram of a receiver R100 according to such an embodiment. A set of n fingers 100 is configured to receive a complex signal S10 and to output corresponding estimates S70 of a symbol carried by the transmitted signal. For example, each finger 100 may be configured to perform implementations of tasks T110 and T120 as described herein. In some cases, each finger 100 may also be configured to perform an implementation of task T170 as described herein. The elements of a finger may be implemented in software, firmware, and/or in hardware.

Searcher 300 detects the locations in time of peaks in the signal S10 and assigns to each of some or all of the fingers an instance corresponding to one of the peaks. For example, searcher 300 may be configured to detect peaks in the signal S10 according to their energy values.

Lock state calculator 200 is configured to receive a signal quality value S40 from each finger and to output a corresponding lock state indication S50. For example, lock state calculator 200 may be configured to perform implementations of tasks T140 and T150 as described herein, and possibly an implementation of task T130 as described herein. Combiner 400 is configured to coherently combine the symbol estimates S70 into a complex-valued combined estimate S90 of the symbol carried by the transmitted signal. For example, combiner 400 may be configured to perform an implementation of task T160 as described herein.

Figure 17:
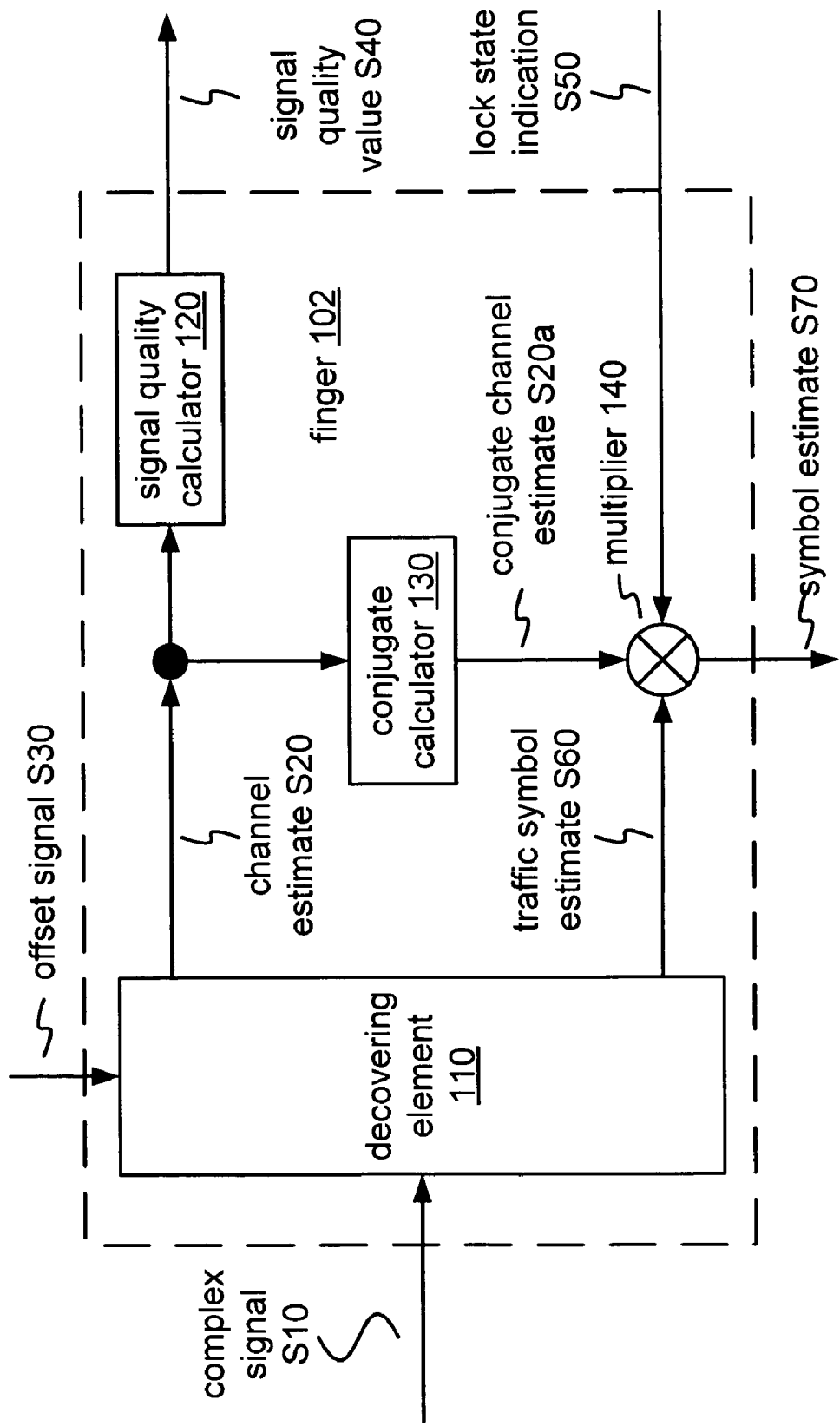
FIG. 17 shows a block diagram of an implementation 102 of finger 100.

FIG. 17 shows a block diagram of an implementation 102 of a finger 100 that may be used in an implementation of receiver R100. Decovering element 110 is configured to remove one or more covering codes from a received instance and to output a channel estimate S20 and a traffic symbol estimate S60 that are based on signal S10. Signal quality calculator 120 is configured to output a signal quality value based on channel estimate S20. Conjugate calculator 130 is configured to calculate the complex conjugate S20a of channel estimate S20. For example, conjugate calculator 130 may be configured to invert the sign of the quadrature component of channel estimate S20. Multiplier 140 is configured to output a symbol estimate S70 based on conjugate S20a, traffic symbol estimate S60, and a lock state indication S50.

Figure 18A:
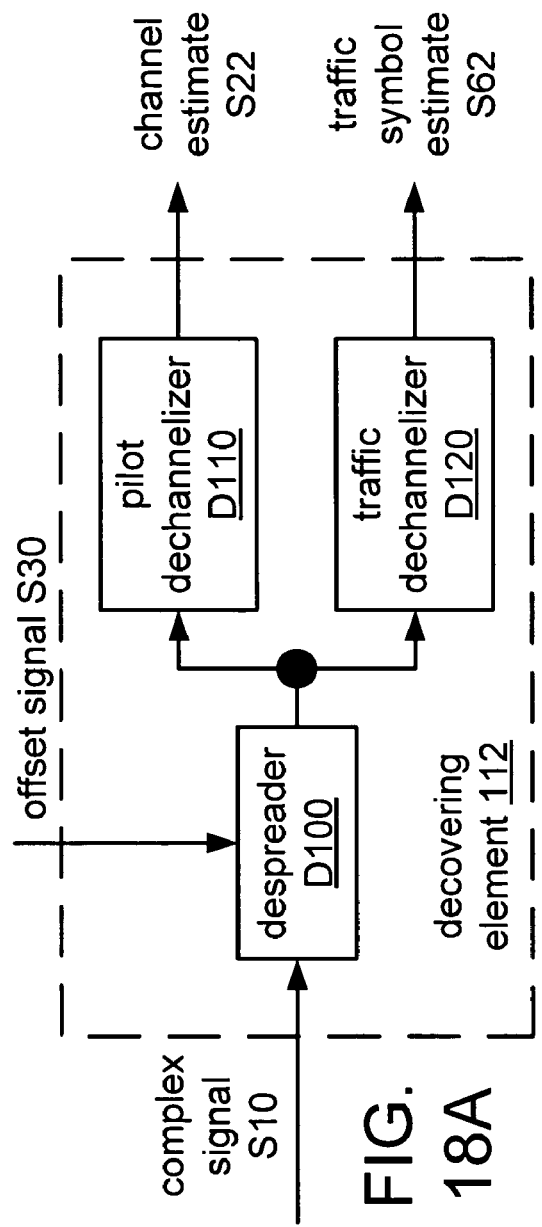
FIGS. 18A,B show block diagrams of two implementations of decoder 110.

FIG. 18A shows a block diagram of an implementation 112 of decovering element 110. Despreader D100 is configured to apply a despreading code to the complex signal S10 according to an offset signal S30. The despreading code is typically a binary pseudonoise (PN) sequence, which may be retrieved from storage and/or calculated according to an algorithm. The offset signal S30, which may be received from a searcher such as searcher 300, indicates a relative time delay of the corresponding instance, which may be expressed as an offset of the despreading code in chips or fractions thereof. In some implementations, offset signal S30 includes the despreading code with the appropriate offset. Alternatively, despreader D100 may calculate and/or retrieve the despreading code from storage according to the offset signal S30.

Despreader D100 may include a complex multiplier configured to apply a complex despreading code to complex signal S10. In other applications, despreader D100 may include two real multipliers configured to apply respective real despreading codes separately to each of the in-phase and quadrature components of complex signal S10. In some cases a despreading code applied by despreader D100 may include more than one PN sequence. For example, the despreading code may include a short PN spreading code and a long PN scrambling sequence, such as a sequence assigned to the UE. Alternatively, despreader D100 may be configured to apply each of more than one PN sequence serially.

The despread signal typically carries a pilot channel, at least one traffic channel, and possibly one or more control channels. Decovering element 112 includes a pilot dechannelizer D110 configured to output a stream of pilot symbols based on the despread signal. For example, pilot dechannelizer D110 may be configured to apply a channelization code, such as an Orthogonal Variable Spreading Factor (OVSF) code or Walsh code, to the despread signal. In such case, pilot dechannelizer D110 may be implemented to apply the code using a complex multiplier or pair of real multipliers. In a typical application, the pilot channelization code is OVSF code zero or Walsh code zero.

Pilot dechannelizer D110 may also be configured to sum consecutive samples of the dechannelized signal to produce an implementation S22 of estimated channel response S20 that is a sequence of symbols. For example, pilot dechannelizer D110 may be configured to include a summer followed by a switch that closes once every symbol period. In such case, the number of samples summed into one symbol may depend on the sampling rate, which typically has a value of chip×1, chip×2, chip×4, or chip×8 or more, and the number of chips per symbol, which typically has a value of from 64, 128, or 256. The pilot channel may also be orthogonal in time to a traffic channel or control channel, such that pilot symbols are interleaved with non-pilot symbols on the same channel. Alternatively, the pilot channel may be orthogonal to one or more other channels in both code and time.

Traffic dechannelizer D120 is configured to output a stream of traffic symbols based on the despread signal. For example, traffic dechannelizer D120 may be configured to apply a channelization code, such as an Orthogonal Variable Spreading Factor (OVSF) code or Walsh code, to the despread signal. In such case, traffic dechannelizer D120 may be implemented to apply the code using a complex multiplier or pair of real multipliers.

Traffic dechannelizer D120 may also be configured to sum consecutive samples of the dechannelized signal to produce an implementation S62 of traffic symbol estimate S60 that is a sequence of symbols. For example, traffic dechannelizer D120 may be configured to include a summer followed by a switch that closes once every symbol period. In such case, the number of samples summed into one symbol may depend on the sampling rate, which typically has a value of chip×1, chip×2, chip×4, or chip×8 or more, and the number of chips per symbol, which typically has a value of from 64, 128, or 256. In a typical CDMA system, the chip rate (chip×1) is 1.2288 MHz.

It may be desirable to filter the sequence of pilot symbols. For example, it may be desirable to perform a time-averaging operation and/or low-pass filtering operation on this sequence. It may also be desirable to apply a filtering operation having a period that is greater than an expected average fade interval.

Figure 18B:
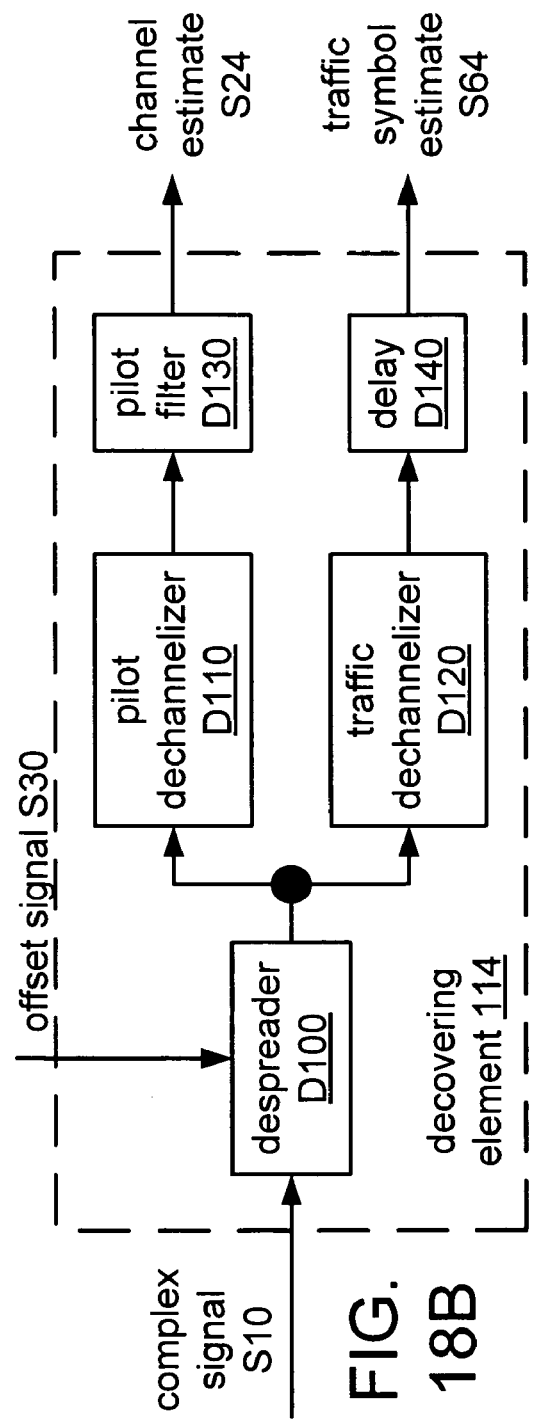

FIG. 18B shows a block diagram of an implementation 114 of decovering element 110 that includes a pilot filter D130. Filter D130, which produces an implementation S24 of estimated channel response S20, may be configured as a first-order IIR. For example, pilot filter D130 may be configured to filter the sequence P of pilot symbols according to an expression such as:

$$z(i)=fP(i)+(1-f)z(i-1)=fP(i)+z(i-1)-fz(i-1),$$

where z denotes the filter output, f denotes a tap weight, and i denotes a time index. It may be desired to select tap weight f to be a negative integer power of 2, such that multiplication by f may be implemented efficiently as a binary shift. To keep the estimated channel response and traffic symbol aligned in time, decovering element 114 may also include a delay D140, which produces an implementation S64 of traffic symbol estimate S60 that is delayed according to a characteristic delay of pilot filter D130.

Figure 19A:
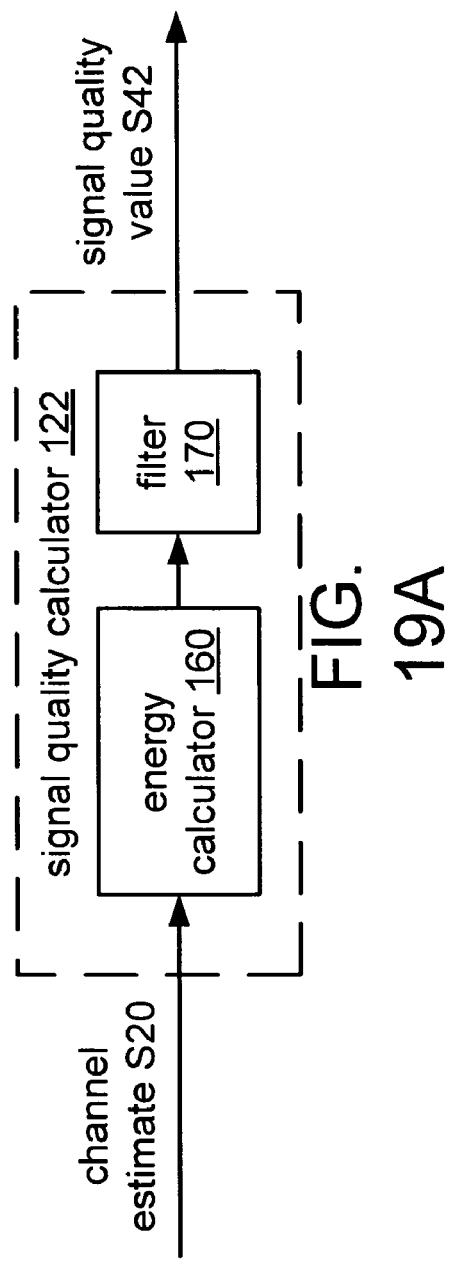
FIG. 19A shows a block diagram of an implementation 122 of signal quality calculator 120.

FIG. 19A shows a block diagram of an implementation 122 of signal quality calculator 120 which generates an implementation S42 of signal quality value S40 as a filtered magnitude squared of the channel estimate S20. Signal quality calculator 122 includes an energy calculator 160 that calculates an energy signal E according to the expression $E(i)=[P_i(i)]^2+[P_q(i)]^2$, where $P_i$ and $P_q$ denote the in-phase and quadrature components of channel estimate S20, respectively, and i denotes a time index.

Signal quality calculator 122 also includes a filter 170, which performs a time-averaging operation and/or low-pass filtering operation on energy signal E and may be implemented as a first-order infinite-impulse-response (IIR) filter. For example, filter 170 may be configured to filter the energy signal E to produce the signal quality value S42 according to an expression such as:

$$y(i)=gE(i)+(1-g)y(i-1),$$

where y denotes the filter output and i denotes a time index. A typical value of the tap weight g for a symbol length of 64 chips is $1/128$ (or $2^{-7}$), multiplication by which may be implemented as a binary right-shift of seven bits. A typical value of the tap weight g for a symbol length of 256 chips is $1/32$ (or $2^{-5}$), multiplication by which may be implemented as a binary right-shift of five bits.

Estimated channel response S20 may be a complex value that characterizes a rotation and scaling caused by the transmission channel. Multiplier 140 is configured to output a symbol estimate S70 based on conjugate S20a, traffic symbol estimate S60, and a lock state indication S50. For example, multiplier 140 may include a digital multiplier, a ganged switch according to FIG. 3A, or a ganged AND gate according to FIG. 3B to apply a binary-valued lock state indication S50 to conjugate S20a or to traffic symbol estimate S60. In such case, multiplier 140 may also include a digital multiplier configured to apply the result to the other of conjugate S20a and traffic symbol estimate S60.

Alternatively, multiplier 140 may include one of such digital multiplier, switch, or gate structures to apply a binary-valued lock state indication S50 to a product of conjugate S20a and traffic symbol estimate S60. In such case, multiplier 140 may also include a digital multiplier configured to compute the product of conjugate S20a and traffic symbol estimate S60. In other implementations, lock state indication S50 may be applied to the result of coherently demodulating the traffic symbol estimate S60, where the demodulation result is obtained by performing a dot product and a cross product of the traffic symbol estimate S60 with the channel estimate S20.

Combiner 400 is configured to calculate a combined symbol estimate S90 as a sum of two or more of the symbol estimates S70, depending on the respective lock states of the corresponding fingers. Combiner 400 may also be configured to apply a weight as described herein to each of the symbol estimates S70 to be combined. In some implementations, one or more lower bits of symbol estimates S70 and/or combined symbol estimate S90 may be truncated by a bit truncator (not shown) to reduce bit handling requirements. Receiver R100 may also be implemented such that lock state indication S50 is applied to control storage of a respective symbol estimate to a corresponding buffer of combiner 400, as in the storage example of FIG. 3D.

Combiner 400 may be configured to perform a deskewing operation to align the various symbol estimates S70 before they are summed. For example, combiner 400 may include a deskew buffer into which each of the symbol estimates to be combined is written, according to a corresponding offset in time and/or code phase space. Alternatively, each of the fingers 100 may include a deskew buffer to align the symbol estimates S70 before they are delivered to combiner 400. Examples of such deskew configurations are discussed in Kang, U.S. Pat. No. 6,735,240, entitled "SYSTEM AND METHOD OF DESKEW BUFFERING SIGNALS," issued May 11, 2004. Another deskewing operation that may be applied takes advantage of both PN shifting and time delay and is described in Lundby, U.S. Publ. Pat. Appl. No. 2004/0184513, entitled "METHOD AND APPARATUS FOR MULTIPATH DEMODULATION IN A CODE DIVISION MULTIPLE ACCESS COMMUNICATION SYSTEM," published Sep. 23, 2004.

Figure 19B:
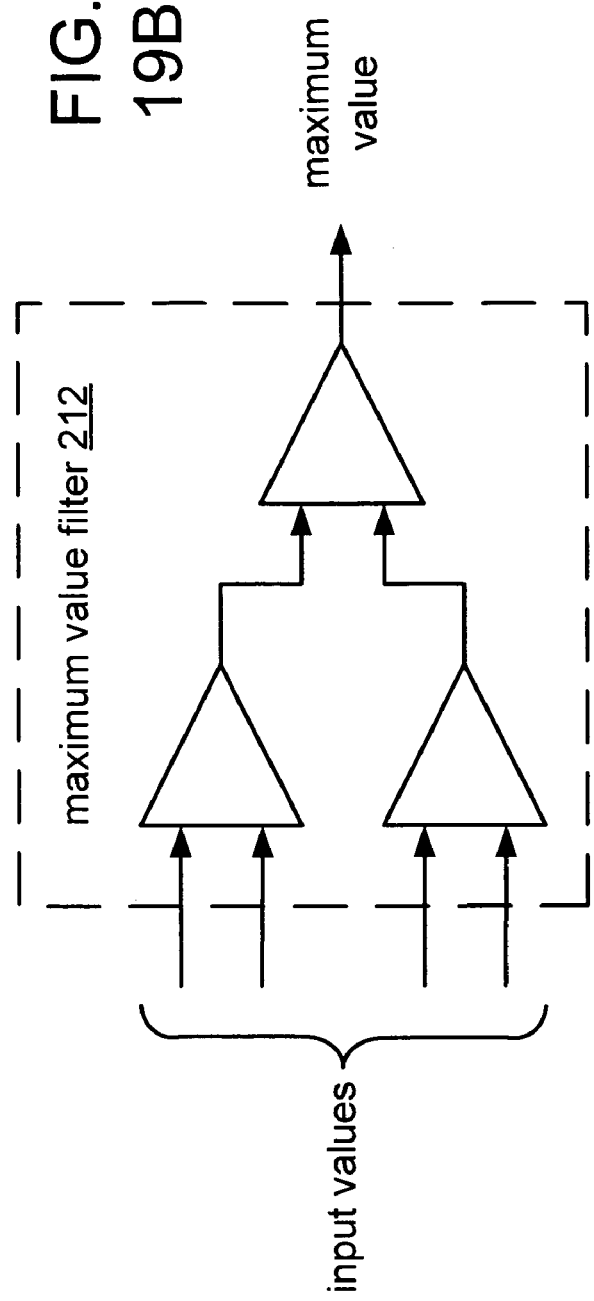
FIG. 19B shows a block diagram of an implementation 212 of maximum value filter 210.
Figure 20:
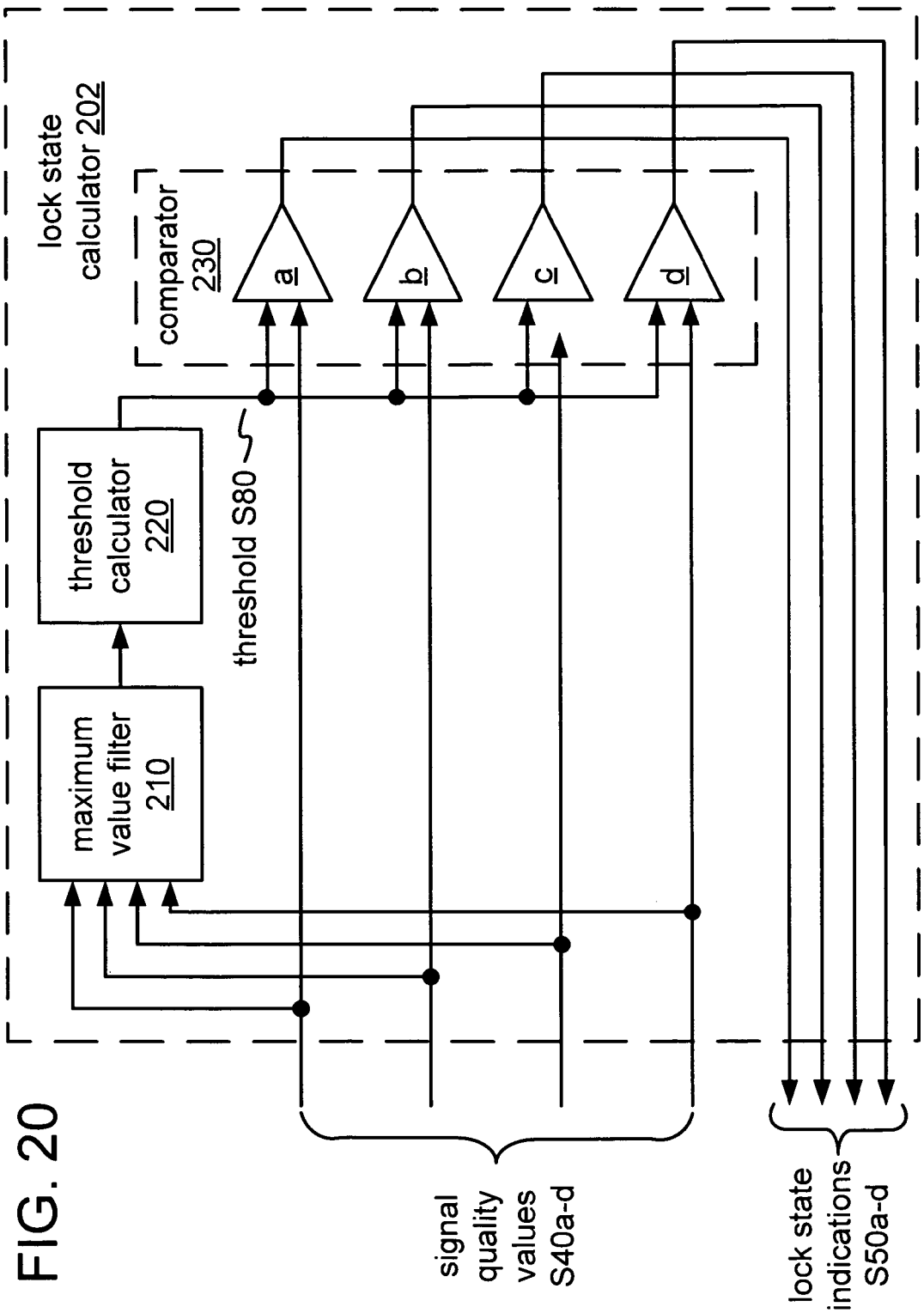
FIG. 20 shows a block diagram of an implementation 202 of lock state calculator 200.

FIG. 20 shows a block diagram of an implementation 202 of lock state calculator 200 for an example in which n has the value 4. Maximum value filter 210 is configured to determine the maximum among the signal quality values S40a-d obtained by the fingers. FIG. 19B shows a block diagram of an implementation 212 of maximum value filter 210, which includes three compare-and-select circuits configured to compute the maximum among four inputs.

Threshold calculator 220 is configured to calculate a threshold S80 relative to the maximum value produced by filter 210. Threshold calculator 220 may be implemented as an adder to subtract a delta value from the maximum value. In one example, the delta value is 10 dB, although any other value may be used. Threshold calculator 220 may be implemented as a multiplier to apply a gain factor to the maximum value, such as a factor less than 1. In one example, the gain factor is 0.1, although any other value may be used. In the case of a multiplier, threshold calculator 220 may be implemented as a shifter. Applying a right-shift of three bits to a binary integer value, for example, is an efficient way to divide the value by 8. In at least some implementations, a new value of threshold S80 and/or each of the signal quality values S40 may be calculated for each symbol period.

A delta value or multiplier as applied by threshold calculator 220 may be a fixed value or a variable one. Such a value may be calculated or selected, for example, according to the response of a filter such as a pulse-shaping filter and/or according to a signal parameter such as sidelobe strength. In further implementations, threshold calculator 220 is configured to calculate threshold S80 by subtracting a delta value from the maximum value and then applying a gain factor to the result, or by applying a gain factor to the maximum value and then subtracting a delta value from the result.

Threshold calculator 220 may also be configured to impose a lower bound on threshold S80 as described herein. In further implementations, the relative lock threshold S80 is used as an upper lock threshold, and threshold calculator 220 is also configured to calculate a lower lock threshold as described herein.

For at least some of the n signal quality values, comparator 230 is configured to output a lock state indication S50 that has a value based on a relation between a corresponding signal quality value S40 and the threshold S80. For example, comparator 230 may be configured to output a lock state indication S50 having a value of unity if the RSSI is at least equal to the threshold S80, and a value of zero otherwise. In the implementation shown, comparator 230 is implemented as a set of n comparators 230a-d, each configured to compare a respective one of the RSSIs to the threshold S80. For ease of implementation it may be desired to perform a comparison for each of the n RSSIs, although a comparison for the maximum RSSI may not be strictly necessary, and comparator 230 or another element of lock state calculator 200 may also be configured to assign a lock state of "in-lock" to the corresponding finger.

Comparator 230 may be implemented to compare the threshold to values that are derived from or otherwise based on the signal quality values. For example, comparator 230 may be configured to compare the threshold S80 to signal quality values that have been bitwise truncated. Although a parallel implementation is shown, comparator 230 may also be implemented in a serial fashion, with at least one comparator configured to compare more than one signal quality value S40 to threshold S80 during a symbol period. In further implementations, comparator 230 is configured to apply threshold S80 as an upper lock threshold and to apply another threshold calculated by threshold calculator 220 as a lower lock threshold.

Figure 21:
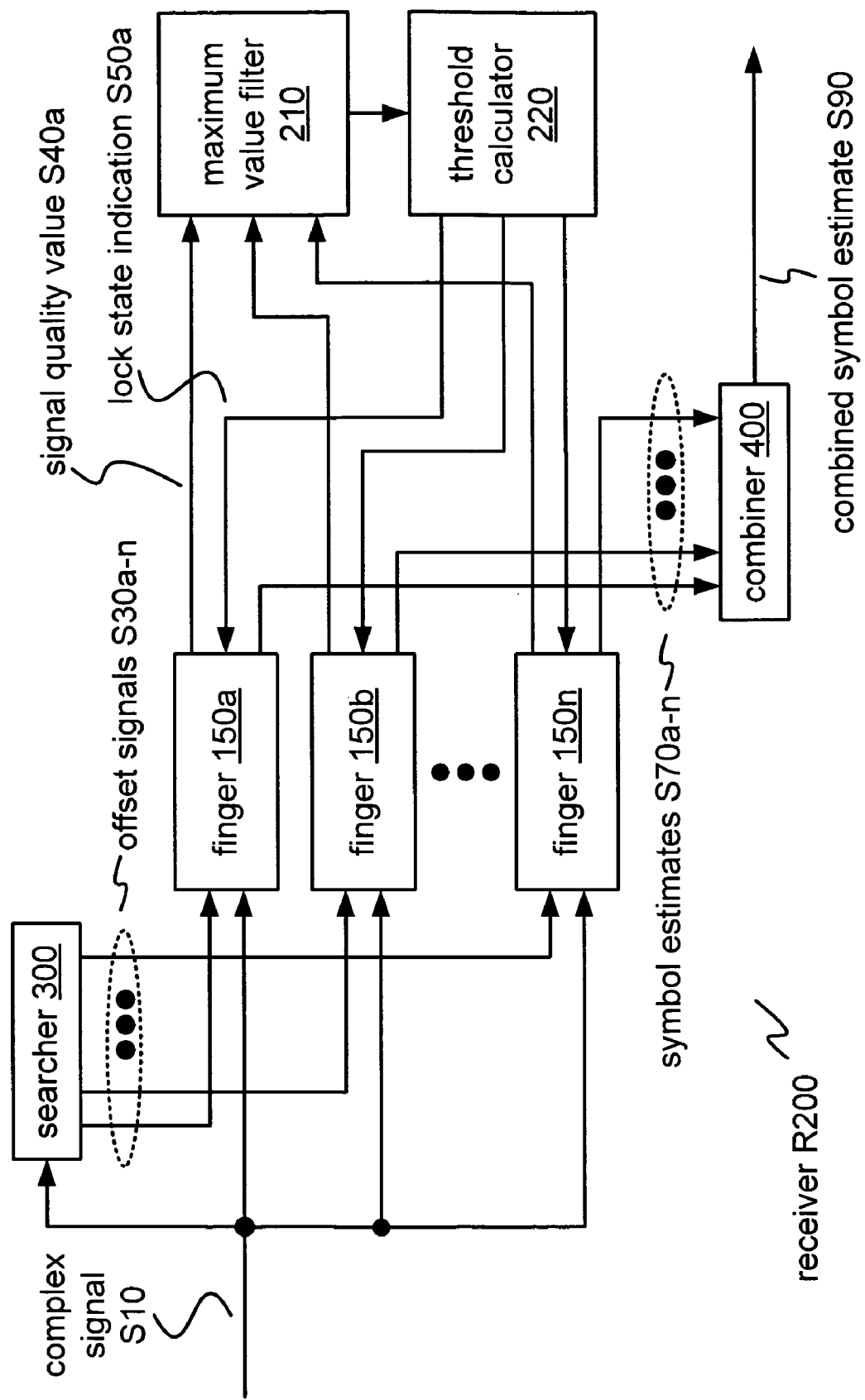
FIG. 21 shows a block diagram of a receiver R200 according to an embodiment.
Figure 22:
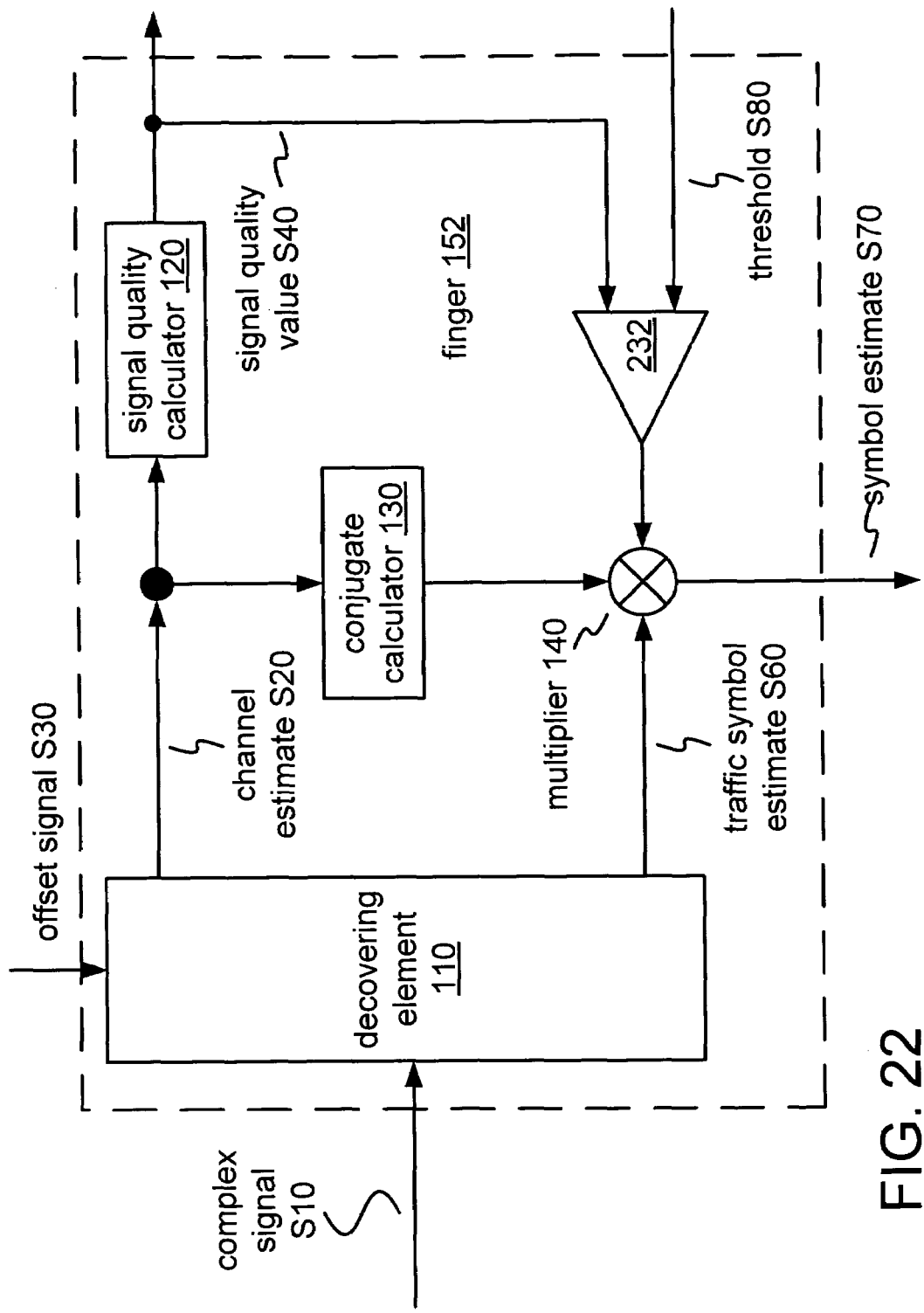
FIG. 22 shows a block diagram of an implementation 152 of finger 150.

FIG. 21 shows a block diagram of a receiver R200 according to another embodiment, in which comparison of the signal quality values to threshold S80 is performed within the fingers. In other respects, receiver R200 has the characteristics of a receiver R100 as described herein. FIG. 22 shows a block diagram of an implementation 152 of finger 150, which includes a comparator 232.

In further applications of the principles described herein, a value is calculated for a lock threshold that is used in a power control loop. For example, a determination of whether the finger's power control bits should be included in a combined power control bit value may be based on a relation between the threshold and a signal quality value of the finger, where the combined value is used to adjust the transmit power of a BTS, and where the threshold value is based on a maximum among the signal quality values of the fingers.

In other configurations, a finger has at least two distinct lock states, such that a decision of whether the finger will be reassigned to another instance is based on a different lock state than the decision of whether the symbol estimate corresponding to the finger will be included in a combined symbol estimate. In such case, the value of each lock state may be based on a relation between a corresponding threshold and the finger's signal quality value, where one or both thresholds are based on a maximum among the signal quality values of the fingers.

In some implementations, a different formula is used to calculate threshold S80 based on the maximum signal quality value depending upon an operating mode of the UE. For example, a different formula may be used depending upon whether the UE is monitoring a paging channel or is engaged in active communication on a traffic channel. Likewise, a different formula may be used depending upon whether the UE is in soft handoff, hard handoff, or no handoff. A device having a receiver according to an embodiment may also include a fade timer configured to power down circuitry of the device (such as RF circuitry), where the fade timer is triggered when no finger has been in lock for some delay period (for example, five seconds).

Other finger and/or receiver implementations to which principles as described herein may be applied include those described in Lundby, U.S. Publ. Pat. Appl. No. 2004/0184513; Eberhardt et al., U.S. Pat. No. 5,754,583, entitled "COMMUNICATION DEVICE AND METHODS FOR DETERMINING FINGER LOCK STATUS IN A RADIO RECEIVER," issued May 19, 1998; and Easton, U.S. Pat. No. 5,764,687, entitled "MOBILE DEMODULATOR ARCHITECTURE FOR A SPREAD SPECTRUM MULTIPLE ACCESS COMMUNICATION SYSTEM," issued Jun. 9, 1998. In some implementations, different fingers may be used to demodulate different channels carried by the received signal S10, such as pilot, voice traffic, data traffic, and control channels.

Figure 23:
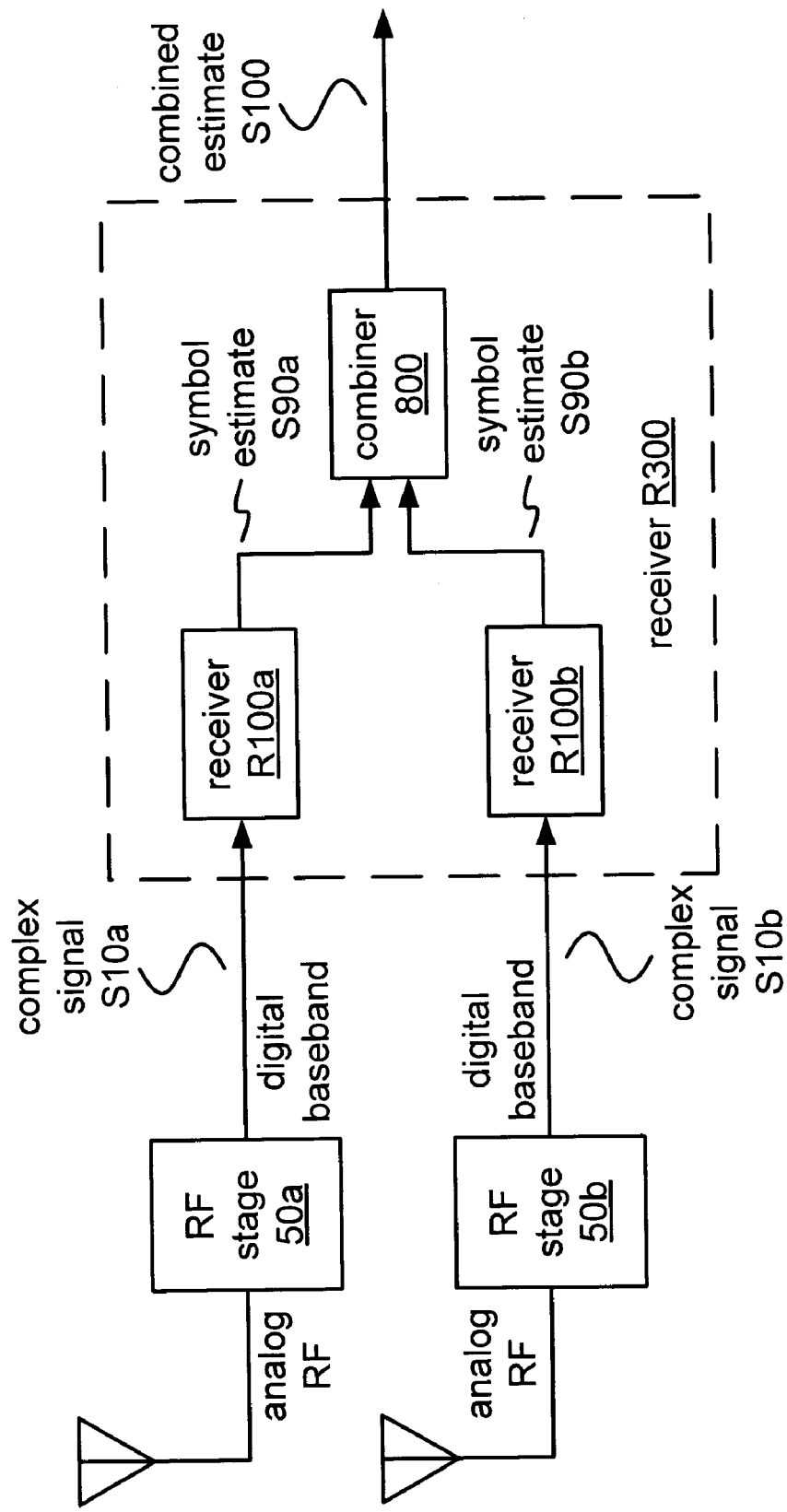
FIG. 23 shows a block diagram of a receive diversity system including a receiver R300 according to an embodiment.

FIG. 23 shows a block diagram of a receiver R300 according to an embodiment that includes two or more instances of receiver R100 (or R200). In this receive diversity arrangement, each of the receiver instances receives an instance of complex signal S10 via a separate antenna and RF stage. Each receiver instance may be configured to calculate and apply a separate instance of threshold S80, or two or more of the receiver instances may apply the same value of threshold S80.

Combiner 800 is configured to calculate a combined symbol estimate S100 based on a sum of the combined symbol estimates S90 from the various receiver instances. In another implementation, combiner 800 may be configured to receive symbol estimates S70 instead and to calculate the combined symbol estimate S100 according to a description of combiner 400 as described herein. In the latter case, combiner 400 may be omitted from each of the receiver instances.

Figure 24A:
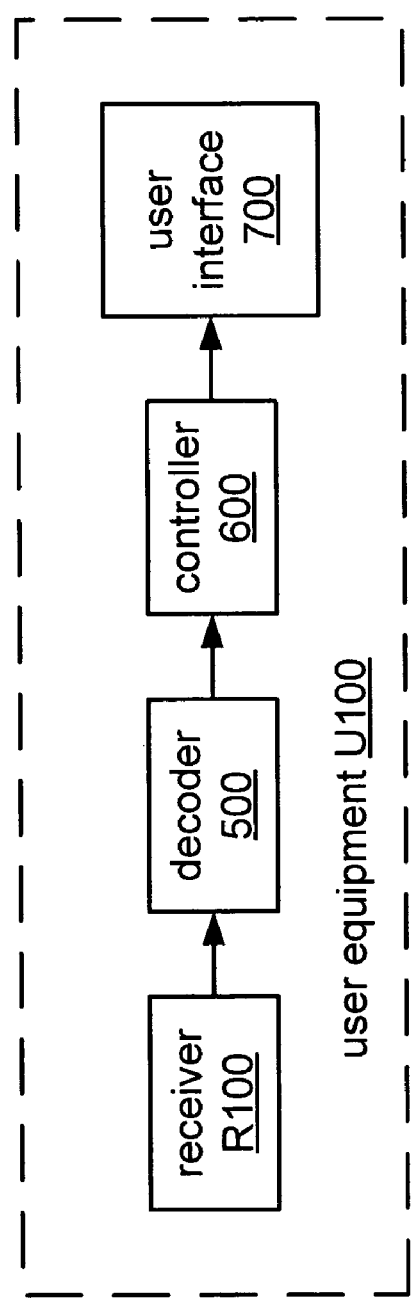
FIGS. 24A,B show block diagrams of user equipment U100, U200, respectively, according to embodiments.

FIG. 24A shows a block diagram of a UE U100 according to an embodiment that includes an implementation of receiver R100 (or receiver R200 or R300). A decoder 500 is configured to receive a stream of combined symbol estimates S90 (or S100) and decode and output the data to controller 600. Decoder 500 may be configured to perform de-interleaving and/or redundancy decoding and may include a Viterbi decoder, a convolutional decoder, a turbo decoder, and/or another suitable decoder.

Figure 24B:
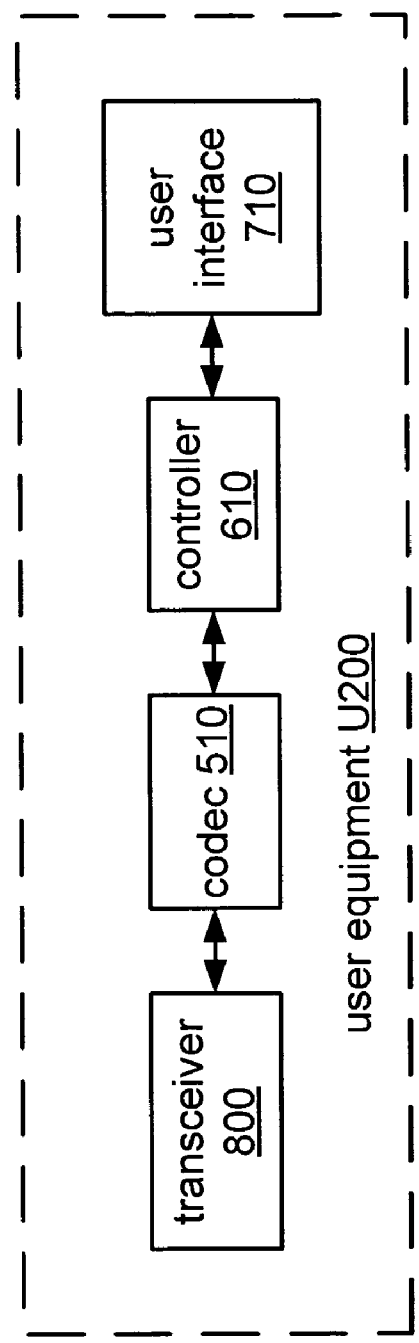

Controller 600 is configured to format the decoded data into recognizable voice or information for use by user interface 700. Controller 600 may also be configured to receive control information from and provide control signals to other elements of UE U100. Controller 600 typically includes a microprocessor and memory and may also be configured to perform other operations of UE U100, such as control processing and/or calculation operations of receiver R100. A user interface 700 communicates the received information or voice to a user and/or to another device. Typically, the user interface 700 includes one or more of a display, a keypad, a speaker, a microphone, and a data port such as a USB or PCMCIA port. UE U100 may be part of a cellular telephone or other mobile or portable unit, such as a wireless data modem or other peripheral device, a personal digital assistant (PDA), a global positioning system (GPS) device, or a camera or other multimedia device FIG. 24B shows a block diagram of another UE U200 that is also configured to transmit information received via an implementation 710 of user interface 700. An implementation 610 of controller 600 is configured to perform control operations for transmission as well, and an implementation 510 of decoder 500 is configured as a codec (coder-decoder). An implementation of receiver R100, R200, or R300 is included within and/or otherwise integrated into transceiver 800, which is also configured to transmit a complex baseband signal carrying the information to be transmitted.

The foregoing presentation of the described embodiments is provided to enable any person skilled in the art to make or use the present invention. Various modifications to these embodiments are possible, and the generic principles presented herein may be applied to other embodiments as well. For example, an embodiment may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit.

For example, the principles described herein may be used on the forward and/or reverse link of a CDMA or other spread-spectrum system. Such principles may be applied to reception of voice traffic and/or to reception of data traffic from a packet data serving node (PDSN). Thus, the present invention is not intended to be limited to the embodiments shown above but rather is to be accorded the widest scope consistent with the principles and novel features disclosed in any fashion herein.

The various elements of a receiver or other device or apparatus may be implemented as electronic and/or optical devices residing, for example, on the same chip or among two or more chips in a chipset, although other arrangements without such limitation are also contemplated. One or more elements of such a device or apparatus may be implemented in whole or in part as one or more sets of instructions executing on one or more fixed or programmable arrays of logic elements (e.g. transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g. a processor used to execute portions of code corresponding to different elements at different times, or an arrangement of electronic and/or optical devices performing operations for different elements at different times).

What is claimed is:

1. A method of signal processing, said method comprising:
    for each of a plurality of received instances of a transmitted signal, obtaining (A) a complex-valued estimate of a symbol carried by the transmitted signal and (B) a signal quality value;
    based on at least one among the plurality of signal quality values, calculating a threshold value, wherein the threshold value is dynamic and is based on a received signal strength indication (RSSI);
    for each of the plurality of received instances, determining a corresponding lock state, wherein for at least one of the plurality of received instances, said determining is based on a relation between the corresponding signal quality value and the threshold value; and
    based on the symbol estimates and the corresponding lock states, transforming the plurality of received instances into a complex-valued combined estimate of the symbol carried by the transmitted signal.

2. The method of signal processing according to claim 1, wherein said transforming the plurality of received instances into a complex-valued combined estimate comprises coherently combining at least two of the complex-valued estimates.

3. The method of signal processing according to claim 1, wherein said complex-valued combined estimate includes an estimate of a first value carried by an in-phase component of the symbol and an estimate of a second value carried by a quadrature component of the symbol, the second value being different than the first value.

4. The method of signal processing according to claim 1, wherein said transforming the plurality of received instances into a complex-valued combined symbol estimate comprises, for each of the plurality of received instances, including the corresponding complex-valued symbol estimate in the complex-valued combined symbol estimate if the corresponding lock state has a first value, and excluding the corresponding complex-valued symbol estimate from the complex-valued combined symbol estimate if the corresponding lock state has a second value different than the first value.

5. The method of signal processing according to claim 1, said method comprising, for each of the plurality of received instances, obtaining an estimate of a response of the corresponding transmission channel,
    wherein, for at least one of the plurality of received instances, the signal quality value is based on the corresponding estimated channel response.

6. The method of signal processing according to claim 5, said method comprising, for at least one of the plurality of received instances and based on the corresponding estimated channel response, altering a phase of the complex-valued symbol estimate.

7. The method of signal processing according to claim 1, said method comprising, for each of the plurality of received instances, obtaining (C) a complex-valued estimate of another symbol carried by the transmitted signal and (D) another signal quality value;
    based on at least one among the other signal quality values, calculating another threshold value; and
    calculating a complex-valued combined estimate of the other symbol, based on the complex-valued estimates of the other symbol, the other signal quality values, and the other threshold value.

8. The method of signal processing according to claim 1, wherein said method is performed with respect to a first symbol carried by the transmitted signal during a first symbol period, said method comprising performing a second instance of the method of signal processing according to claim 1 with respect to a second symbol carried by the transmitted signal during a second symbol period consecutive to the first symbol period, wherein the second symbol is different than the first symbol, said method comprising performing a third instance of the method of signal processing according to claim 1 with respect to a third symbol carried by the transmitted signal during a third symbol period consecutive to the second symbol period, wherein the third symbol is different than the first symbol and wherein the third symbol is different than the second symbol.

9. The method of signal processing according to claim 1, wherein said transforming the plurality of received instances into a complex-valued combined estimate includes compensating for a relative time delay between at least two of the symbol estimates.

10. The method of signal processing according to claim 1, wherein said obtaining a signal quality value includes calculating a measure of received energy.

11. The method of signal processing according to claim 1, wherein the plurality of received instances includes a first set received via a first antenna and a second set received via a second antenna different than the first antenna.

12. The method of signal processing according to claim 1, wherein the plurality of received instances includes a first set received via a first antenna and a second set received via a second antenna different than the first antenna, and further comprising calculating a second threshold value, wherein the second threshold value is dynamic and is based on a second received signal strength indication (RSSI), and wherein said determining a corresponding lock state is based, for at least one of the first set, on a relation between the corresponding signal quality value and the first threshold value and, for at least one of the second set, on a relation between the corresponding signal quality value and the second threshold value.

13. A data storage medium having a set of machine-readable instructions describing the method of signal processing according to claim 1.

14. An apparatus for signal processing, said apparatus comprising:

a plurality of fingers, each configured to calculate, for a corresponding one of a plurality of received instances of a transmitted signal, (A) a signal quality value and (B) a complex-valued estimate of a symbol carried by the transmitted signal;

a threshold calculator configured to calculate a threshold value based on at least one among the plurality of signal quality values, wherein the threshold value is dynamic and is based on a received signal strength indication (RSSI);

a comparator configured to determine a lock state for each of the plurality of received instances; and a combiner configured to calculate, based on the symbol estimates and the corresponding lock states, a complex-valued combined estimate of the symbol carried by the transmitted signal, wherein, for each of more than one of the plurality of received instances, said comparator is configured to determine the corresponding lock state based on a relation between the corresponding signal quality value and the threshold value.

15. The apparatus for signal processing according to claim 14, wherein each of said plurality of fingers is configured to calculate an estimate of a response of the corresponding transmission channel, and wherein at least one of said plurality of fingers is configured to calculate the corresponding signal quality value based on the corresponding estimated channel response.

16. The apparatus for signal processing according to claim 15, wherein at least one of said plurality of fingers is configured to alter a phase of the complex-valued symbol estimate based on the corresponding estimated channel response.

17. The apparatus for signal processing according to claim 14, wherein each of said plurality of fingers is configured to calculate a signal quality value for each of at least three consecutive symbol periods, and wherein said threshold calculator is configured to calculate a different instance of the threshold value for each of the at least three consecutive symbol periods, and wherein, for each of the at least three consecutive symbol periods, and for each of the plurality of received instances, said comparator is configured to determine a corresponding lock state based on a relation between the corresponding signal quality value and the instance of the threshold value for that period.

18. The apparatus for signal processing according to claim 14, wherein the plurality of received instances includes a first set received via a first antenna and a second set received via a second antenna different than the first antenna.

19. An apparatus for signal processing, said apparatus comprising:

means for obtaining, for each of a plurality of received instances of a transmitted signal, (A) a complex-valued estimate of a symbol carried by the transmitted signal and (B) a signal quality value;

means for calculating, based on at least one among the plurality of signal quality values, a threshold value, wherein the threshold value is dynamic and is based on a received signal strength indication (RSSI);

means for determining, for each of the plurality of received instances, a corresponding lock state, wherein for at least one of the plurality of received instances, said determining is based on a relation between the corresponding signal quality value and the threshold value; and means for calculating, based on the symbol estimates and the corresponding lock states, a complex-valued combined estimate of the symbol carried by the transmitted signal.

20. The apparatus for signal processing according to claim 19, said apparatus comprising means for obtaining, for each of the plurality of received instances, an estimate of a response of the corresponding transmission channel, wherein, for at least one of the plurality of received instances, said means for obtaining a complex-valued estimate and a signal quality value is configured to calculate the signal quality value based on the corresponding estimated channel response.

21. The apparatus for signal processing according to claim 20, wherein, for at least one of the plurality of received instances, said means for obtaining a complex-valued estimate and a signal quality value is configured to alter a phase of the complex-valued symbol estimate based on the corresponding estimated channel response.

22. The apparatus for signal processing according to claim 19, wherein each of said means for obtaining a complex-valued estimate and a signal quality value is configured to calculate a signal quality value for each of at least three consecutive symbol periods, and wherein said means for calculating a threshold value is configured to calculate a different instance of the threshold value for each of the at least three consecutive symbol periods, and wherein, for each of the at least three consecutive symbol periods, and for each of the plurality of received instances, said means for determining a corresponding lock state is configured to determine a corresponding lock state based on a relation between the corresponding signal quality value and the instance of the threshold value for that period.

23. The apparatus for signal processing according to claim 19, wherein the plurality of received instances includes a first set received via a first antenna and a second set received via a second antenna different than the first antenna.

* * * * *

UNITED STATES PATENT AND TRADEMARK OFFICE
CERTIFICATE OF CORRECTION

PATENT NO.      : 7,630,427 B2                          Page 1 of 1
APPLICATION NO. : 11/361887
DATED           : December 8, 2009
INVENTOR(S)     : Banister et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 886 days.

Signed and Sealed this

Twenty-first Day of December, 2010

David J. Kappos
*Director of the United States Patent and Trademark Office*